(12) United States Patent
Walther et al.

(10) Patent No.: US 7,627,251 B2
(45) Date of Patent: Dec. 1, 2009

(54) WAVELENGTH DIVISION AND POLARIZATION DIVISION MULTIPLE ACCESS FREE SPACE OPTICAL TERMINAL USING A SINGLE APERTURE

(75) Inventors: Frederick G. Walther, Winchester, MA (US); Jeffrey M. Roth, Arlington, MA (US); William E. Keicher, Burlington, MA (US); Alan E. DeCew, W. Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 510 days.

(21) Appl. No.: 10/603,071

(22) Filed: Jun. 24, 2003

(65) Prior Publication Data

US 2004/0081466 A1    Apr. 29, 2004

Related U.S. Application Data

(60) Provisional application No. 60/422,185, filed on Oct. 29, 2002.

(51) Int. Cl.
*H04B 10/00* (2006.01)

(52) U.S. Cl. .................. 398/118; 398/128; 398/129; 398/130; 398/131; 398/152

(58) Field of Classification Search .............. 398/152, 398/118–131, 156; 359/152, 159, 172, 156, 359/298; 356/326; 382/294
See application file for complete search history.

(56) References Cited

U.S. PATENT DOCUMENTS

| | | | | |
|---|---|---|---|---|
| 5,347,387 A * | 9/1994 | Rice | ............................ | 398/129 |
| 5,627,669 A * | 5/1997 | Orino et al. | ................... | 398/129 |
| 5,710,652 A * | 1/1998 | Bloom et al. | ............... | 398/129 |
| 6,262,837 B1 * | 7/2001 | Nagano et al. | ............... | 359/368 |
| 6,327,063 B1 * | 12/2001 | Rockwell | ..................... | 398/122 |
| 6,335,811 B1 * | 1/2002 | Sakanaka | ..................... | 398/129 |
| 6,347,001 B1 * | 2/2002 | Arnold et al. | ............... | 398/122 |
| 6,618,177 B1 * | 9/2003 | Kato et al. | ................... | 398/129 |
| 6,643,064 B2 * | 11/2003 | Huang et al. | ................. | 359/497 |
| 6,657,770 B2 * | 12/2003 | Marom et al. | ............... | 359/290 |
| 6,763,149 B2 * | 7/2004 | Riley et al. | .................. | 382/294 |
| 6,782,153 B2 * | 8/2004 | Polinsky et al. | ............... | 385/16 |

(Continued)

*Primary Examiner*—Ken N Vanderpuye
*Assistant Examiner*—Li Liu
(74) *Attorney, Agent, or Firm*—Hamilton, Brook, Smith & Reynolds, P.C.

(57) ABSTRACT

A communication device uses one or two stacks of reflective deflectors to steer the electromagnetic waves carrying signals received and transmitted through a single telescope/aperture device. The signals outside the device may be circularly polarized while inside the device they are linearly polarized most of the time. The deflectors within each stack are transparent to the signals steered by the deflectors behind them. Since the deflecting wave band may shift with the changing angle of incidence of the signals due to steering, the wave bands are sufficiently spaced apart. When the signals impact the deflectors at nearly normal angles, the wave bands can be made more narrow. When more than one stack of deflectors is used, the spacing between the wave bands within one stack may be utilized by another stack. Beam splitters and a variety of other optical devices (such as quarter wave plates, half wave plates, Faraday rotators, and equivalent devices) are used to separate signals for further processing within the device. Instead of reflective deflectors, the device may generally use stacks of transmissive deflectors for similar effect in a similar way.

78 Claims, 14 Drawing Sheets

U.S. PATENT DOCUMENTS 6,940,593 B2 * 9/2005 Farr .......................... 356/326
7,058,307 B2 * 6/2006 Sakanaka .................... 398/119
2002/0176151 A1 * 11/2002 Moon et al. ................. 359/298

* cited by examiner

US 7,627,251 B2

WAVELENGTH DIVISION AND POLARIZATION DIVISION MULTIPLE ACCESS FREE SPACE OPTICAL TERMINAL USING A SINGLE APERTURE

RELATED APPLICATION

This application claims the benefit of U.S. Provisional Application No. 60/422,185, filed on Oct. 29, 2002. The entire teachings of the above application are incorporated herein by reference.

GOVERNMENT SUPPORT

The invention was supported, in whole or in part, by a grant Contract No. F19628-00-C-002 from USAF (Program 26). The Government has certain rights in the invention.

BACKGROUND OF THE INVENTION

This invention is related to communication methods and devices using electromagnetic waves and has particular application to optical communications in free space. The growing interest in dynamic and rapidly deployable free space optical communication links is combined with efforts to increase traffic throughput, implement sophisticated networking capabilities for intelligent routing of data, and widen the utility of optical terminals. Multi-channel approaches can meet these demands, in particular through the use of wavelength division multiplexing (WDM). There are several advantages to WDM that justify its role in free space optical communications. WDM is well established in the 1.5 µm wavelength band, primarily due to availability of erbium amplifiers, and this wavelength range meets eye safety requirements. Furthermore, the necessary components for WDM already exist and growth in terrestrial communications has driven down their prices. In addition, WDM fiber systems are well understood, and this knowledge relates directly to free space WDM systems.

SUMMARY OF THE INVENTION

A method and communication device embodying this invention allow several deflectors to share the same aperture device, which may be a telescope. These deflectors are used to steer the signals carried by electromagnetic waves into and out of the communication device. These deflectors may be combined into one or more stacks for more efficient use of the hardware. To allow such stacking of deflectors, some deflectors, while deflecting the signals steered by them, are at the same time transparent for signals steered by some other deflectors in the same stack. The deflective properties of the deflectors may vary with the angle at which they are positioned in the course of steering, for this reason rather that a single frequency, each deflector may be assigned a wavelength band. This wavelength band may be made narrower if the electromagnetic waves impact the deflectors at a nearly normal angle. Each deflector may handle both the transmitted and received signals coming to and from the same direction. When two stacks of deflectors are used, it may be advantageous to intermesh the wavelength bands used by the deflectors in each stack. Further separation of signals within the device is achieved with beam splitters in combination with quarter wave plates and/or Faraday rotators. The deflectors may be transmissive or reflective.

The present invention provides a communication device, which may comprise an aperture structure and deflectors deflecting respective electromagnetic signals of respective wavelengths at respective angles, the electromagnetic signals passing through the aperture structure. Such device may further comprise an aperture linear/circular polarization device between at least one of the deflectors and the aperture structure. Some deflectors may be movable. The deflectors may form a stack, where at least one deflector in the stack passes a signal deflected by another deflector in the stack. The individual deflectors in the stack may pass signals deflected by other deflectors in the stack. The individual deflectors in the stack may deflect substantially all signals each within its respective non-overlapping wavelength band. Some deflectors in the stack may reflect signals at nearly normal incidence. The deflectors in the stack may be reflectors. The device may also comprise a second stack of deflectors with similar properties sharing the same aperture structure. Second stack deflectors' wavelength bands may be intermeshed with first stack deflectors' wavelength bands, i.e., at least one second stack deflectors' wavelength band is located between two first stack deflectors' wavelength bands and at least one first stack deflectors' wavelength band is located between two second stack deflectors' wavelength bands. Such device may employ a polarization beam splitter coupled to the aperture structure and the first stack, a signal path coupled to the polarization beam splitter, and a linear/circular polarization device or a polarization rotation device, positioned so that electromagnetic signals deflected by at least one of the deflectors in the first stack, are deflected at nearly normal angle, are linearly polarized when leaving and entering the polarization beam splitter, and, before being deflected, first pass through the polarization beam splitter and then pass through the linear/circular polarization device and, after being deflected, first pass through the linear/circular polarization device and then pass through the polarization beam splitter, the deflectors in the first stack being reflectors. Such device may further comprise a transmission path and a reception path, the signal path receiving from the transmission path at least one signal carrying communications transmitted by the device and the reception path receiving from the signal path at least one signal carrying communications received by the device, the electromagnetic signals deflected by at least one of the deflectors in the first stack carrying communications transmitted by the device and communications received by the device. Such device may further comprise a second stack of deflectors deflecting respective electromagnetic signals passing through the aperture structure at respective angles, the individual deflectors in the first stack passing signals deflected by other deflectors in the first stack and individual deflectors in the second stack passing signals deflected by other deflectors in the second stack, the deflectors in the second stack being reflectors; and a second linear/circular polarization device, positioned so that electromagnetic signals deflected by at least one of the deflectors in the second stack, are deflected at nearly normal angle, are linearly polarized when leaving and entering the first polarization beam splitter, and, before being deflected, first pass through the first polarization beam splitter and then pass through the second linear/circular polarization device and, after being deflected, first pass through the second linear/circular polarization device and then pass through the first polarization beam splitter, the direction of polarization of the electromagnetic signals passing through the first linear/circular polarization device being substantially orthogonal, within the signal path, to the direction of polarization of the electromagnetic signals passing through the second linear/circular polarization device. Such device may further comprise a second polarization beam splitter coupled to the signal path; a first transmission path; a first reception path; a second transmission path; a second reception path; a first polarized path coupled to the second polarization beam splitter; the first polarized path receiving from the first transmission path at least one signal carrying communications transmitted by the device and the first reception path receiving from the first polarized path at least one signal carrying communications received by the device; and a second polarized path coupled to the second polarization beam splitter; the second polarized path receiving from the second transmission path at least one signal carrying communications transmitted by the device and the second reception path receiving from the second polarized path at least one signal carrying communications received by the device. In such device electromagnetic signals deflected by at least one of the deflectors may carry communications transmitted by the device and communications received by the device and the aperture structure may be a telescope.

An embodiment of this invention may also be a device for deflecting electromagnetic waves comprising a first deflector deflecting electromagnetic waves within a first wavelength band and passing electromagnetic waves within a second wavelength band and a second deflector deflecting electromagnetic waves within a second wavelength band, the second deflector positioned to receive the electromagnetic waves passed through the first deflector.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Some embodiments of the present invention include at least one linear/circular polarization device with two terminals also known in the art as a quarter wave plate (QWP). Such devices may be used to convert incoming circularly polarized electromagnetic waves into linearly polarized electromagnetic waves and convert incoming circularly polarized electromagnetic waves into linearly polarized electromagnetic waves. A variety of such devices is known in the pertinent art.

Figure 1:
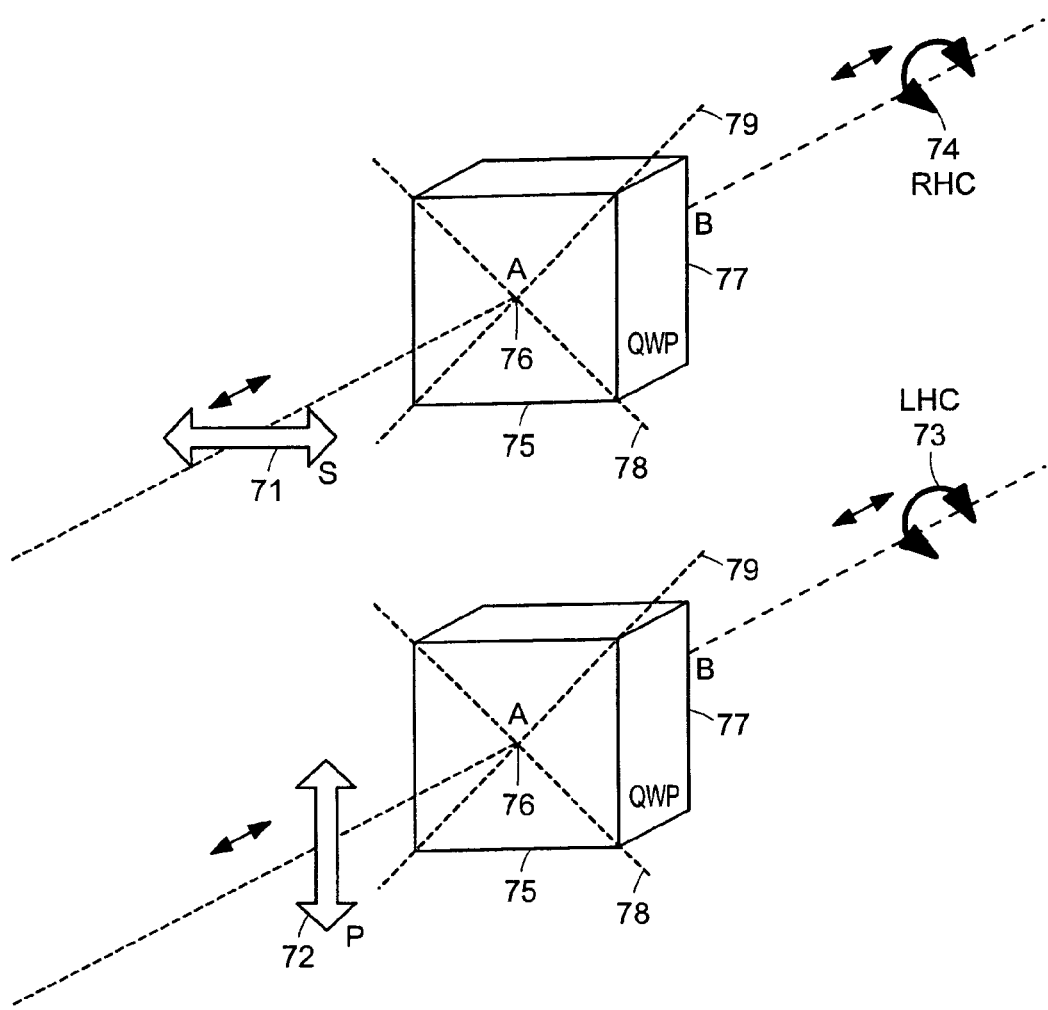
FIG. 1 shows the functioning of a quarter wave plate (QWP).

FIG. 1 schematically shows the functioning of a QWP 75 where the directions of linear polarization (S and P) of electromagnetic waves entering and leaving the QWP 75 are shown as 71 and 72 and the directions of circular polarization (left hand circular (LHC) and right hand circular (RHC)), as defined by the Institute of Electrical and Electronics Engineers, are shown, respectively, as 74 and 73.

In some types of quarter wave plates, the correspondence between the directions of linear polarization and of circular polarization is determined by the orientation of so called "slow" and "fast" axes shown in FIG. 1 as 78 and 79 respectively.

The functioning of a QWP 75, as pertinent to this invention, can be briefly summarized as following:

An incoming wave that is linearly polarized within the plane S 71 on QWP terminal A 76 produces on QWP terminal B 77 an outgoing wave that is RHC polarized 74.

An incoming wave that is linearly polarized within a plane P 72 (P being orthogonal to the plane S) on QWP terminal A 76 produces on QWP terminal B 77 an outgoing wave that is LHC polarized 73.

An incoming wave that is RHC polarized 74 on QWP terminal B 77 produces on QWP terminal A 76 an outgoing wave that is linearly polarized within S 71.

An incoming wave that is LHC polarized 73 on QWP terminal B 77 produces on QWP terminal A 76 an outgoing wave that is linearly polarized within P 72.

Some embodiments of the present invention include at least one 45 degree Faraday rotator (FR). Such two terminal devices may be used to rotate the polarization plane of the incoming linearly polarized light by a set amount in the same direction regardless of the terminal the wave enters. A variety of such devices is known in the pertinent art.

Figure 2:
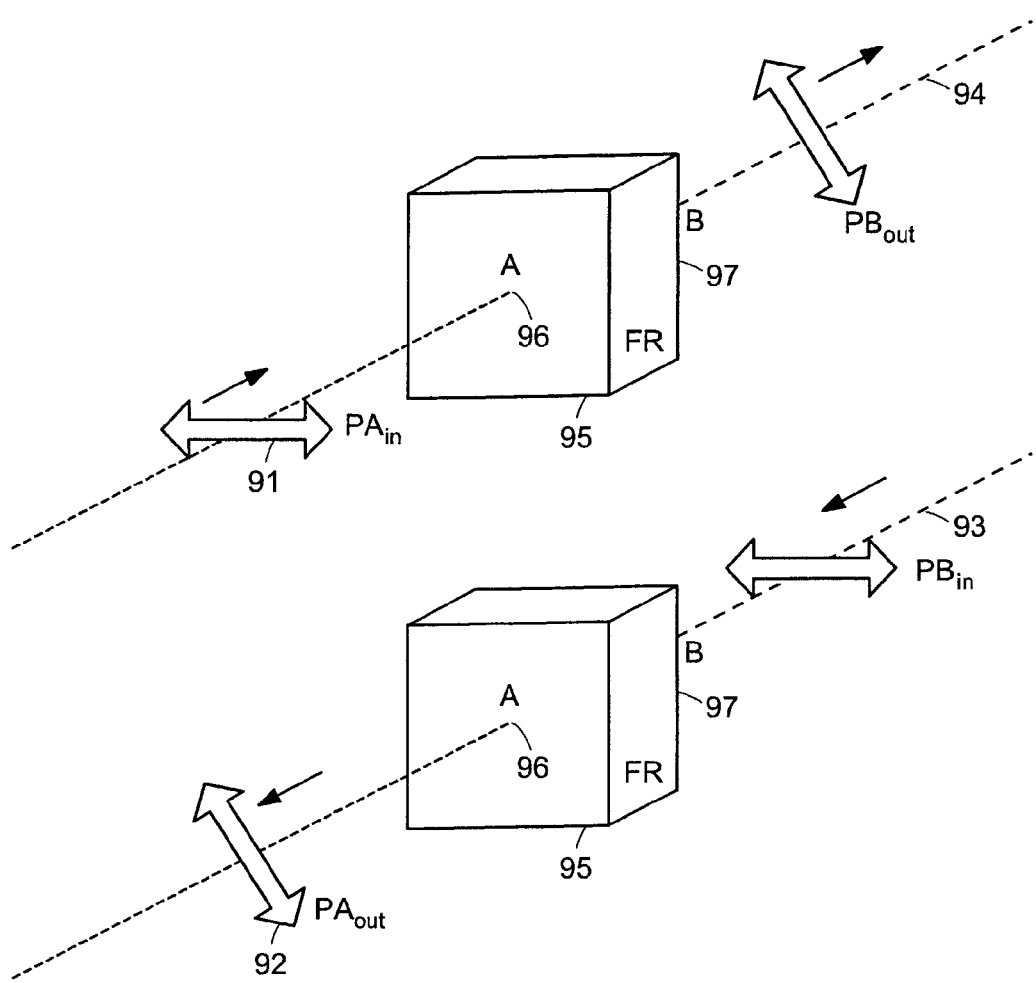
FIG. 2 shows the functioning of a 45 degree Faraday rotator (FR).

FIG. 2 schematically shows the functioning of a FR 95 designed to produce 45 degree rotation where the directions of linear polarization of electromagnetic waves entering and leaving the FR 95 are shown as 91-94.

The functioning of a FR 95, as pertinent to this invention, can be briefly summarized as following:

An incoming wave that is polarized within any plane $PA_{in}$ 91 on FR terminal A 96 produces on FR terminal B 97 an outgoing wave polarized within a plane $PB_{out}$ 94 which is rotated by 45 degrees to $PA_{in}$.

An incoming wave that is polarized within any plane $PB_{in}$ 93 on FR terminal B 97 produces on FR terminal A 96 an outgoing wave polarized within a plane $PA_{out}$ 92 which is rotated by 45 degrees in the same direction to $PB_{in}$ as $PB_{out}$ is to $PA_{in}$.

The principal properties of a FR, as pertinent to this invention, are the following:

An increment in the angle of $PA_{in}$ produces the same increment in the angle of $PB_{out}$. An increment in the angle of $PB_{in}$ produces the same increment in the angle of $PA_{out}$. If $PB_{in}$ is $PB_{out}$, $PA_{in}$ and $PA_{out}$, are orthogonal. If $PA_{in}$ is $PA_{out}$, $PB_{in}$ and $PB_{out}$ are orthogonal.

Some embodiments of the present invention include at least one half wave plate (HWP). Such two-terminal devices may be used to reflect the polarization plane of an incoming linearly polarized electromagnetic wave about a so-called fast axis. A variety of such devices is known in the pertinent art.

Figure 3:
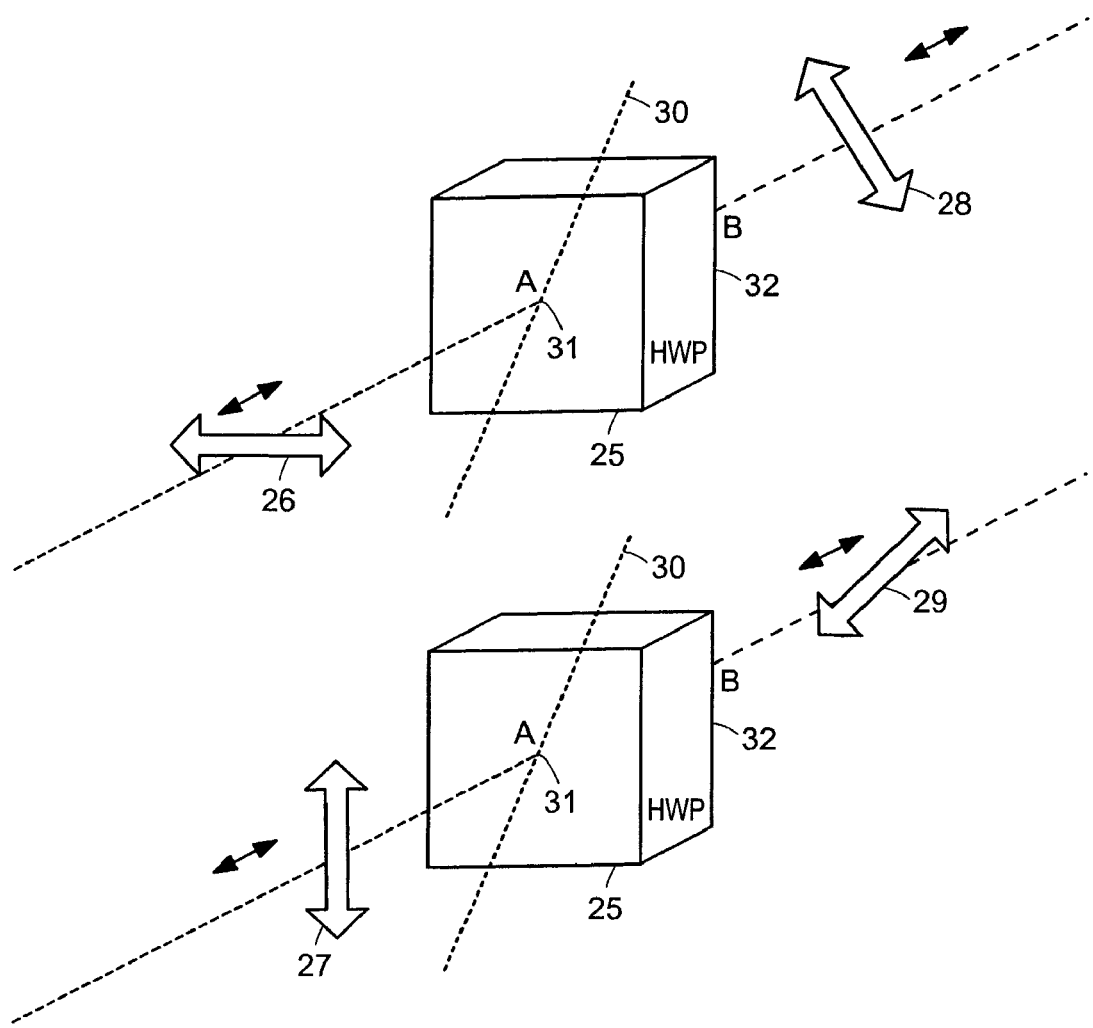
FIG. 3 shows the functioning of a half wave plate (HWP).

FIG. 3 schematically shows the functioning of a HWP 25 with the fast axis 30 where the directions of linear polarization of electromagnetic waves entering and leaving the HWP 25 are shown as 26-29.

The functioning of a HWP, as pertinent to this invention, can be briefly summarized as following:

An incoming wave that is linearly polarized within a plane 26 (at a 67.5 degrees angle to the fast axis 30) on HWP terminal A 31 produces on HWP terminal B 32 an outgoing wave that is polarized within the plane 28 at 45 degrees to the original plane 26.

An incoming wave that is linearly polarized within a plane 28 on HWP terminal B 32 produces on HWP terminal A 32 an outgoing wave that is polarized within the plane 26.

An incoming wave that is linearly polarized within a plane 27 (at a 22.5 degrees angle to the fast axis 30) on HWP terminal A 31 produces on HWP terminal B 32 an outgoing wave that is polarized within the plane 29 at 45 degrees to the original plane 27.

An incoming wave that is linearly polarized within a plane 29 on HWP terminal B 32 produces on HWP terminal A 31 an outgoing wave that is polarized within the plane 27.

Figure 4:
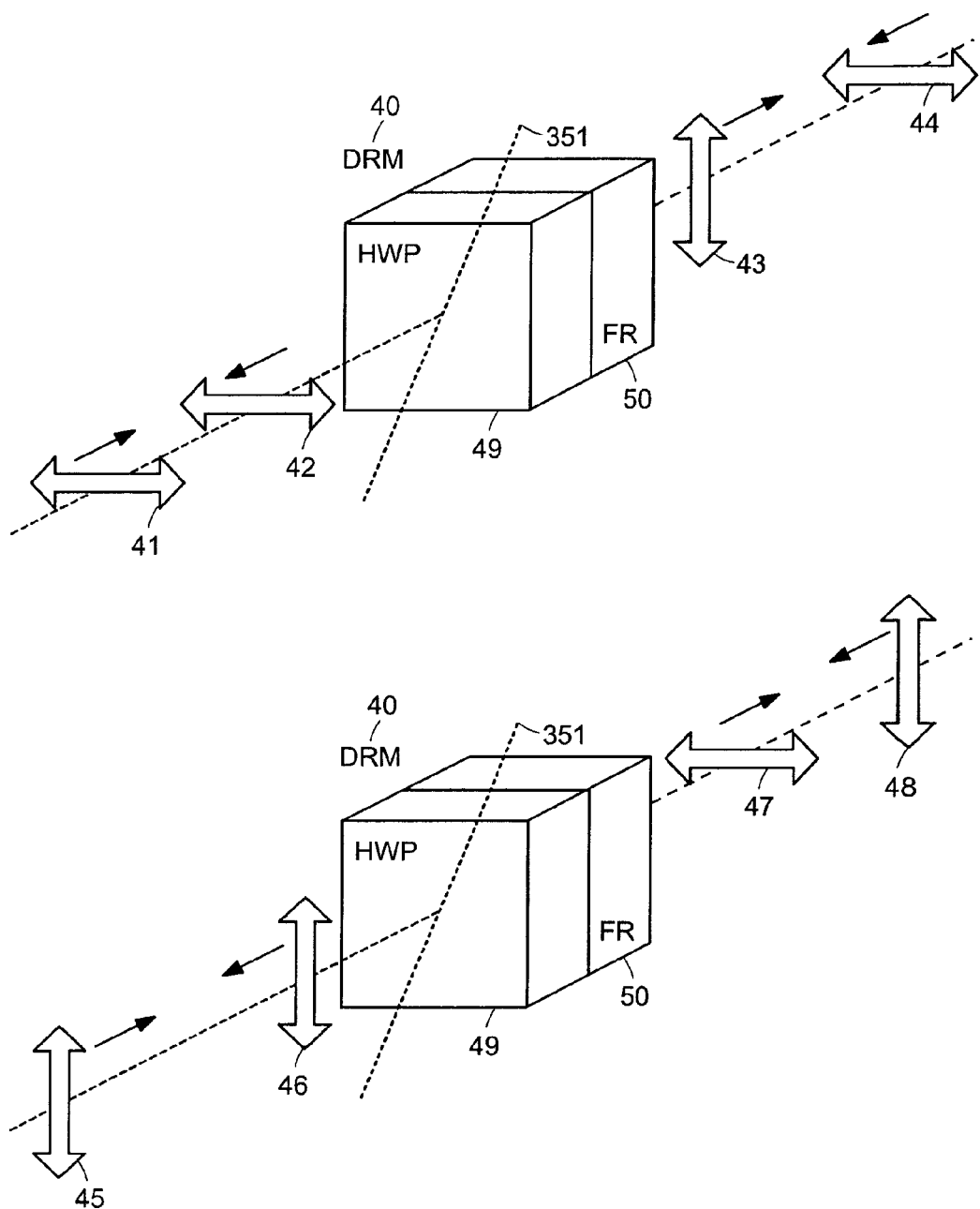
FIG. 4 shows the functioning of a directional rotation module (DRM).

Some embodiments of the present invention include at least one directional rotation module (DRM). FIG. 4 shows the operation of a DRM 40 implemented as a combination of a HWP 49 with its fast axis 351 and a FR 50. Arrows 41-48 show the direction of polarization of linearly polarized electromagnetic waves entering and leaving the DRM 40. Linear polarization planes represented as arrows 41, 42, 44, and 47 are at a 67.5 degrees angle to the fast axis 351. Linear polarization planes represented as arrows 43, 45, 46, and 48 are at a 22.5 degrees angle to the fast axis 351. The DRM 40 allows linear polarization to be rotated 90 degrees when electromagnetic waves travel in one direction and to stay unchanged when they travel in the opposite direction.

Some embodiments of the present invention include at least one polarization beam splitting device or polarization beam splitter (PBS). A variety of such devices is known in the pertinent art. The functioning of one type of PBS, as pertinent to this invention, can be briefly summarized as following: PBS reflects at some non-zero angle electromagnetic waves linearly polarized within plane P1 and is transparent to electromagnetic waves linearly polarized within plane P2, P2 being orthogonal to P1.

Figure 5:
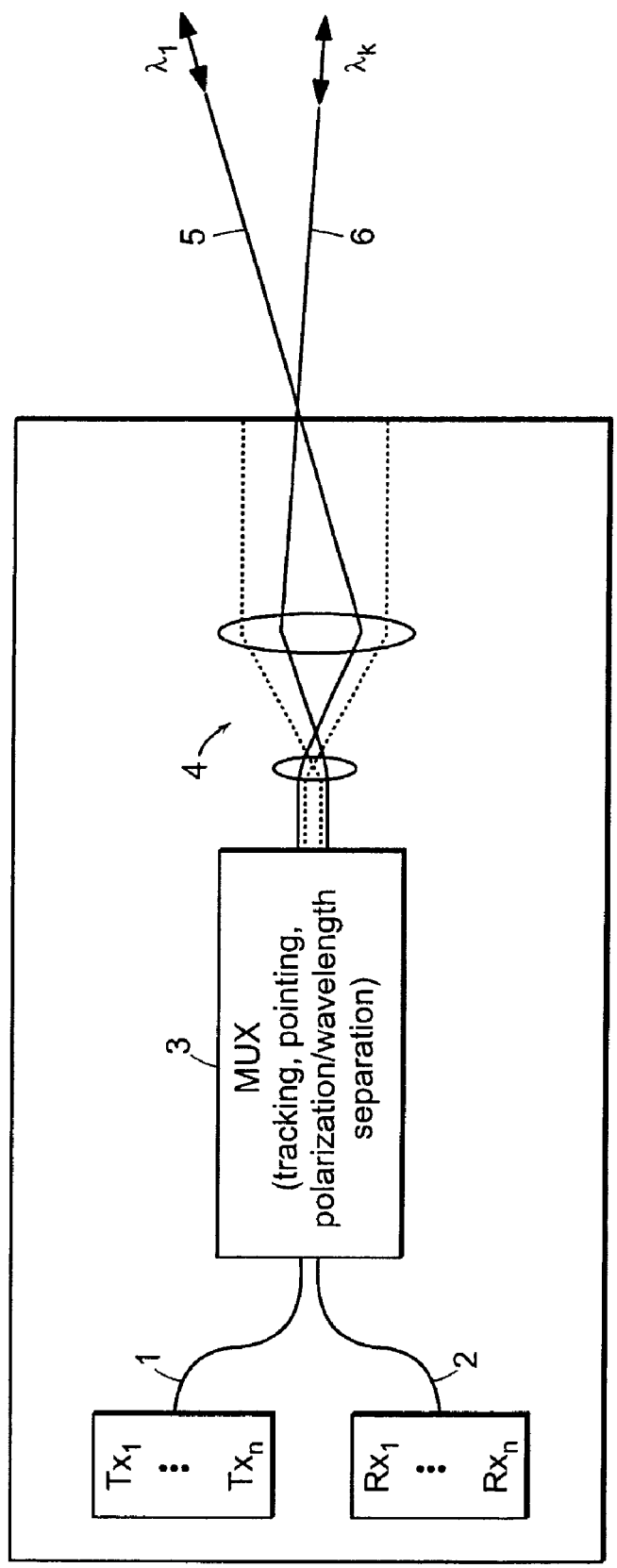
FIG. 5 is a diagram showing the general functioning of an embodiment of this invention.

FIG. 5 schematically shows functioning of an embodiment of this invention. The device 3 transmits electromagnetic signals 1 and receives electromagnetic signals 2 via a single aperture structure 4. The aperture structure 4 allows transmission and receiving of electromagnetic waves 5, 6 from and to multiple directions and with multiple wavelengths λ. The directions of electromagnetic waves 5, 6 can be changed using steerable deflectors within the device 3.

Figure 6:
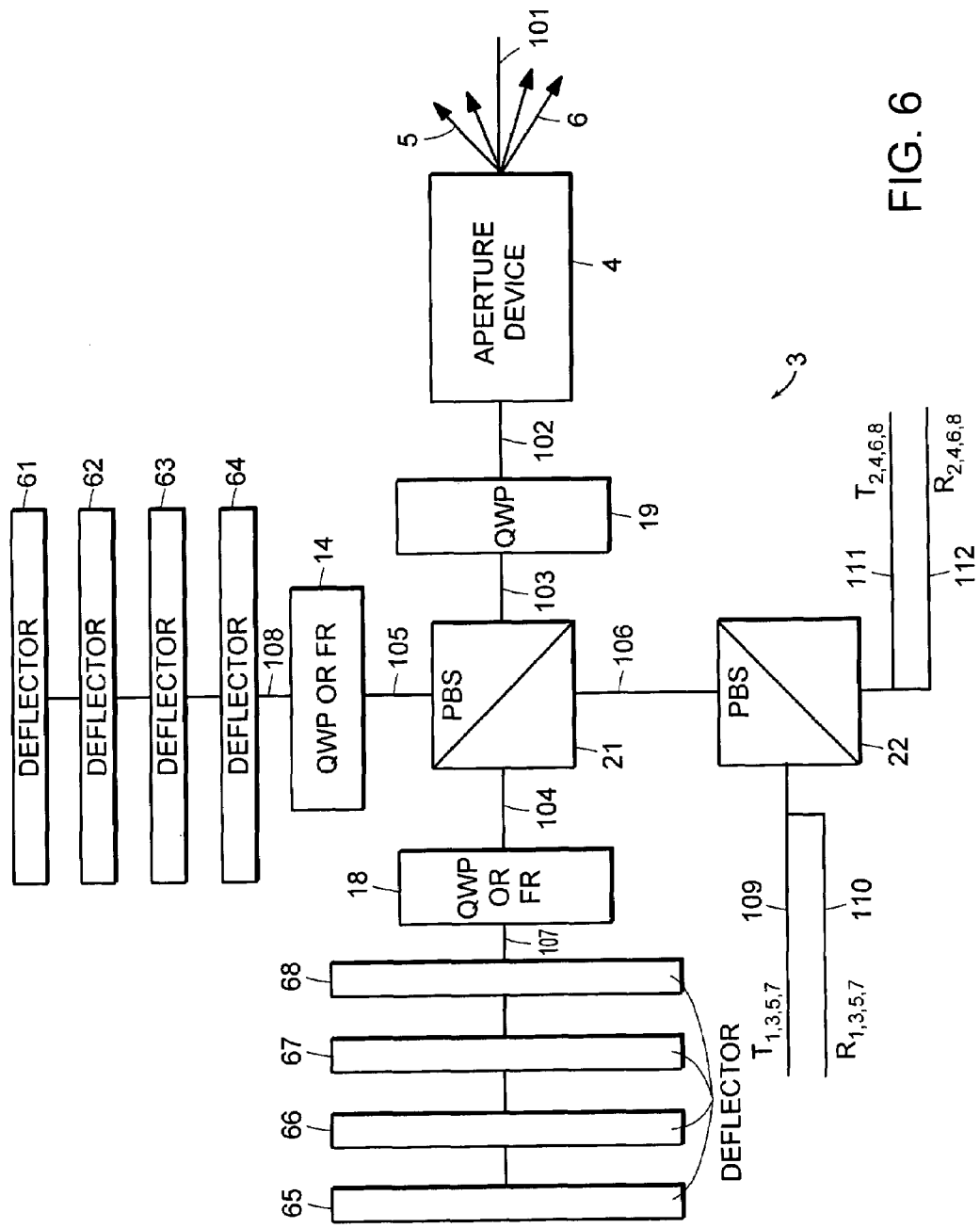
FIG. 6 shows an embodiment of this invention.

FIG. 6 shows a specific embodiment of the device 3 of FIG. 5. The dotted lines show the path traveled by electromagnetic waves carrying signals.

In this embodiment of the invention, the aperture device 4 is a large field of view off-axis afocal telescope. It stands between the optical paths of incoming and outgoing signals outside the device 101 and inside the device 102. These signals are carried by circularly polarized electromagnetic waves. Along the optical path 103 between QWP 19 and PBS 21, the signals are linearly polarized. QWP 19 is responsible for the conversion of circularly polarized signals into linearly polarized signals and vice versa, and any linear/circular polarization device performing this function may be used in this position. For left-hand and right-hand circular polarizations on 102, the corresponding directions of linear polarization on 103 are perpendicular. The PBS 21 is positioned so that it is transparent to signals on 103 polarized along one direction, so that these signals travel along 104, and reflects the signals with perpendicular polarization so that they travel along 105.

If in positions 14 and 18 the embodiment employs QWPs or any linear/circular polarization devices, the signals on 107 and 108 are circularly polarized before they impact one of the deflectors 61-68, and they are circularly polarized in the opposite direction after the deflection After reentering the QWPs in the opposite direction, these signals are converted back into linearly polarized signals, but the direction of the polarization is orthogonal to the original direction, so that a signal for which the PBS 21 was transparent ends up being reflected on PBS 21, and vice versa. The functioning of the deflectors 61-68 will be explained below.

Instead of a QWP, the embodiment shown on FIG. 6 may employ a FR in positions 14 and/or 18 to the same overall effect. The polarization planes of linearly polarized signals on 107 and 108 are rotated by 45 degrees before the signals impact one of the deflectors 61-68. After reentering the FR in the opposite direction, the polarization planes of these signals are further rotated by 45 degrees and end up being polarized in the direction orthogonal to the original direction, so that a signal for which the PBS 21 was transparent ends up being reflected on PBS 21, and vice versa.

Therefore, the embodiment on FIG. 6 provides the following paths for signals leaving the device through the aperture 4:

Path segment 106 to PBS 21 to path segment 105 to QWP or FR 14 to path segment 108 to one of the deflectors 61-64 to path segment 108 to QWP or FR 14 to path segment 105 to PBS 21 to path segment 103.

Path segment 106 to PBS 21 to path segment 104 to QWP or FR 18 to path segment 107 to one of the deflectors 65-68 to path segment 107 to QWP or FR 18 to path segment 104 to PBS 21 to path segment 103.

Both of these paths can also be traversed in the opposite direction for signals entering the device through the aperture 4.

If, as in some embodiments, the deflectors 61-68 are used to direct two signals each (received and transmitted), the embodiment on FIG. 6 then may handle up to 16 independent signals traveling to and from 8 different directions. These reflectors may be movable to allow steering of signals in different directions outside the device or fixed for a set of predetermined directions of communications. The movement of the reflectors may be achieved by placing each detector in a electronic motor-controlled mount that can steer the deflected beam in at least the two directions of pitch and yaw.

Note that the path segment 106 carries all the signals handled by the device and therefore it will be referred to as "signal path". Note also that within the signal path 106 the direction of polarization of signals passing through QWP or FR 18 is substantially orthogonal to the direction of polarization of signals passing through QWP or FR 14.

The signals on the signal path 106 may be separated using the PBS 22 and further separated so that the transmission paths 109 and 111 carry signals $T_{1,3,5,7}$ and $T_{2,4,6,8}$ for transmission by the device (shown as in FIG. 5) while the reception paths 110 and 112 carry signals $R_{1,3,5,7}$ and $R_{2,4,6,8}$ received by the device (shown as 2 in FIG. 5).

The embodiment shown on FIG. 6 uses reflective wavelength selective reflectors in the role of deflectors 61-68. The functioning of these reflectors as deflectors is illustrated on FIGS. 7 and 8. They may be used to steer the signals as they enter and leave the device and each deflector 61-68 may handle signals transmitted to and received from the same direction via the aperture device 4. The arrangement of deflectors 61-68 as two stacks 61-64 and 65-68 permits sharing of the of the aperture 4 and of other elements within the device by several signals. Deflectors 64 and 68 may be referred to as front deflectors, while deflectors 61 and 65 may be referred to as back deflectors.

Figure 7:
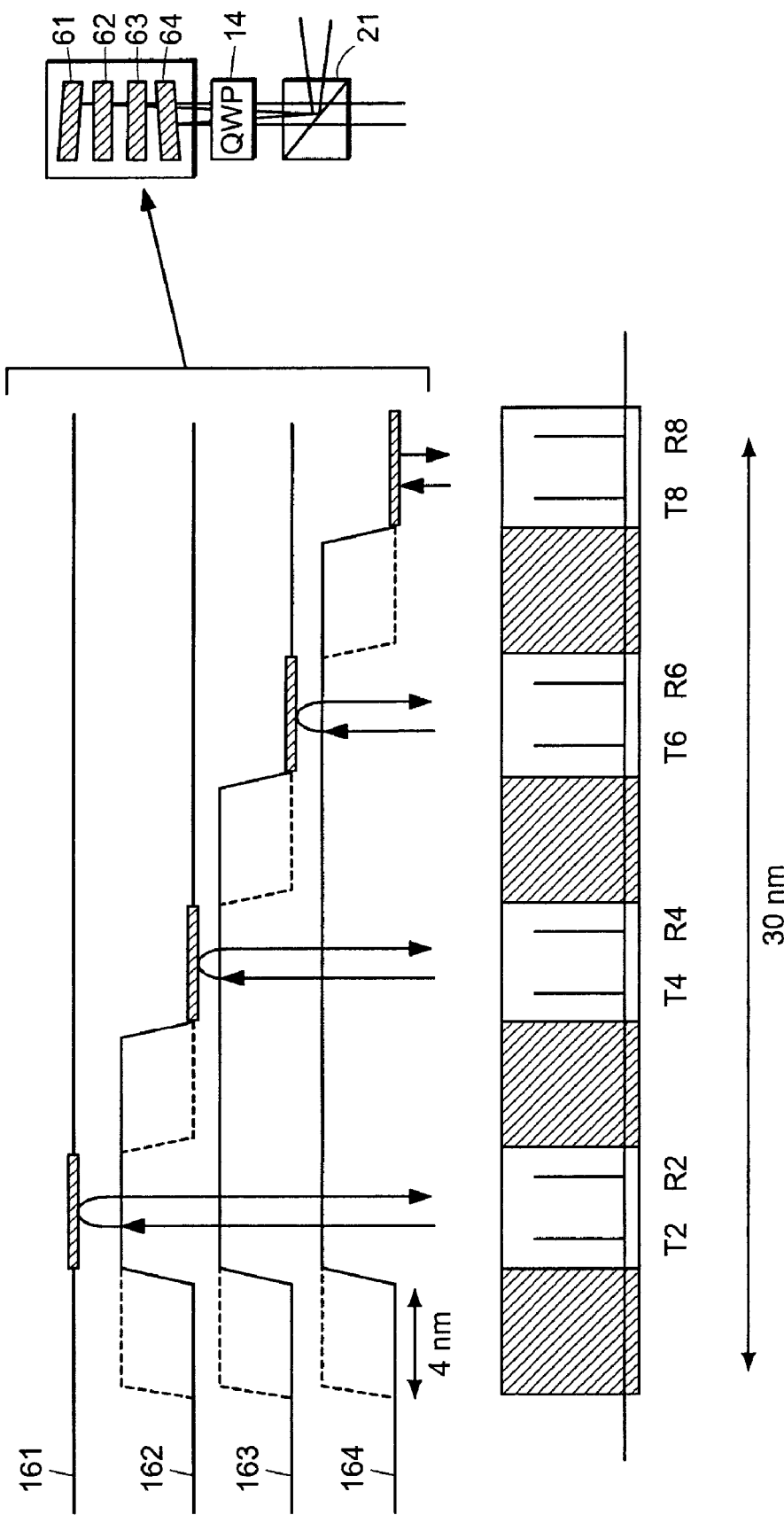
FIG. 7 shows the functioning of a single stack of reflective deflectors used in some embodiments of this invention.

FIG. 7 shows the properties of wavelength selective reflectors as used in an embodiment of the invention.

The horizontal axis for the graphs 161-164 represents the wavelength. The vertical axis for graphs 161-164 represents the reflectivity of the respective reflector at those wavelengths (high value indicating reflection, low value indicating transmission). Graphs 161-164 show, for reflectors 61-64, the reflectivity at normal incidence as solid lines. The dashed lines represent the reflectivity at the maximal angle of incidence used in the shown embodiment of the invention, i.e. when the given reflector is steered to the maximal angle with respect to the path segment 105.

The wavelength selective reflector reflects some electromagnetic waves and is transparent for all wavelengths used by signals steered by the wavelength selective reflectors behind it. If a movable wavelength selective reflector is transparent for different wavelengths depending on the angle of their incidence on the wavelength selective reflectors, the reflector at all its positions should reflect the electromagnetic waves steered by it and stay transparent for the signals that are handled by the reflectors behind it. For example, the wavelength selective reflector 63 at all its positions is transparent for transmitted signals T4 and T2 and for received signals R2 and R4 handled by reflectors 61 and 62, respectively. The reflector 61 does not have to be transparent for any wavelength. Note that in this embodiment, the same reflector is used to receive and transmit signals from and to the same direction.

As can be seen, the functioning of the stack of reflectors 61-64 is unaffected by the motion of the reflectors despite the change in their reflective properties.

Figure 8:
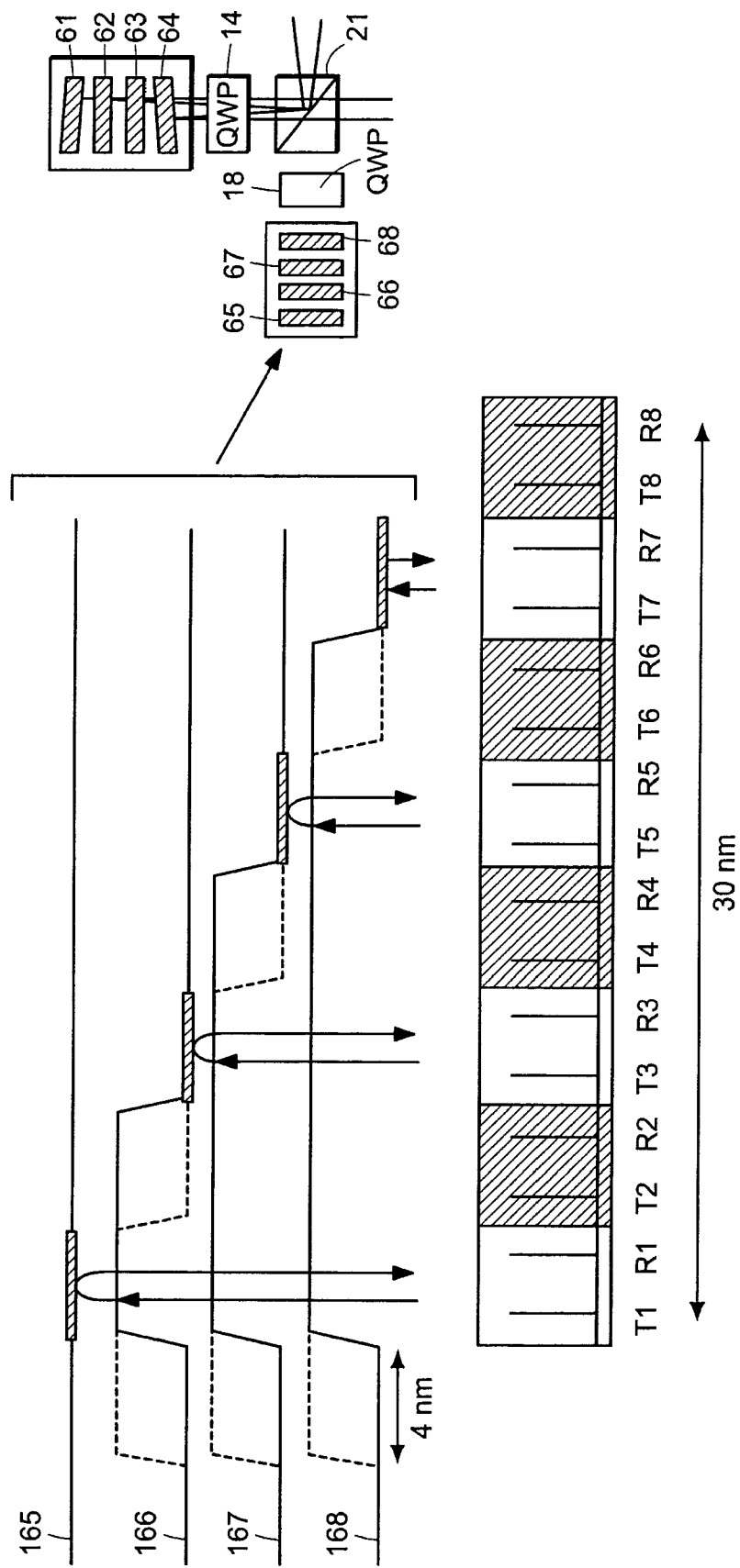
FIG. 8 shows the functioning of two stacks of reflective deflectors used in some embodiments of this invention.

This design may be extended for two stacks of deflectors as shown on FIG. 8 which is analogous to FIG. 7 but shows the allocation of spectrum between two stacks of four deflectors each.

The horizontal axis for the graphs 165-168 represents the wavelength. The vertical axis for graphs 165-168 represents the reflectivity of the respective reflector at those wavelengths (high value indicating reflection, low value indicating transmission). Graphs 165-168 show, for reflectors 65-68, the reflectivity at normal incidence as solid lines. The dashed lines represent the reflectivity at the maximal angle of incidence used in the shown embodiment of the invention, i.e. when the given reflector is steered to the maximal angle with respect to the path segment 104. The wavelengths T2, T4, T6, T8, R2, R4, R6, and R8 together with shaded areas around them correspond to the wavelengths and wave bands allocated to the stack 61-64 as shown in FIG. 7.

The interleaved structure of wave bands used by stacks 61-64 and 65-68 allows efficient utilization of the available spectrum. The usage of a relatively narrow spectrum for operation of an embodiment of the invention may be beneficial for example in cases when some of the components used in the embodiment (such as HWP or QWP) operate properly only within such a narrow spectrum.

Figure 9:
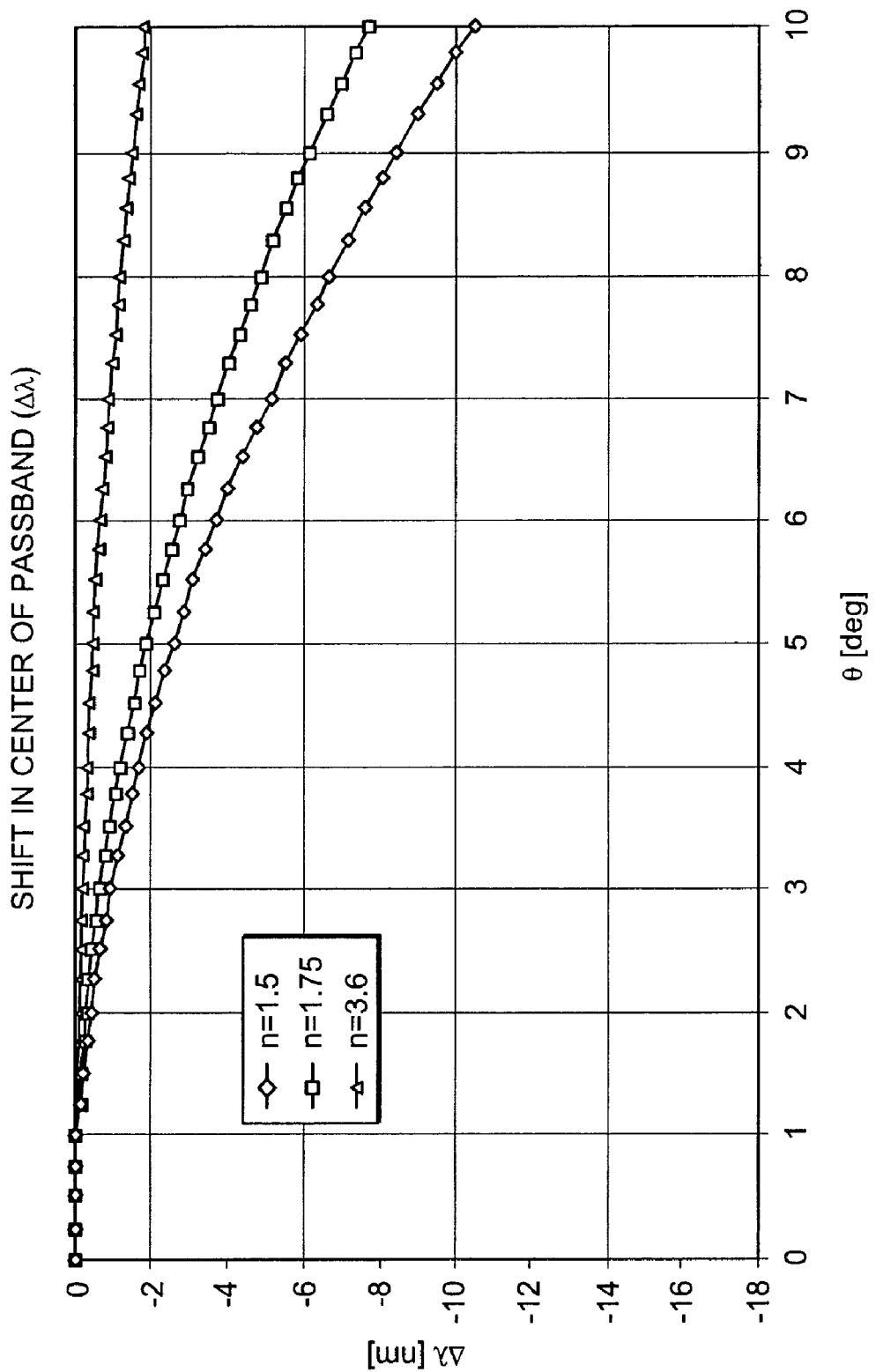
FIG. 9 shows the dependence of the reflective deflectors' passbands on the angle of incidence.

FIG. 9 illustrates the properties of bandpass optical filters that may be used as a part of a wavelength selective reflectors 61-68 used as deflectors in some embodiments. A conventional narrow bandpass interference filter contains alternating dielectric thin film layers constructed of high and low index media. These filters rely on Fabry-Perot effects, and the optical path length through the individual dielectric layers plays a key role in determining the spectral characteristics of the filter. When the angle of incidence changes, this alters the effective path length through the layers, thus modifying the center wavelength of the filter. Moving away from normal incidence causes such a filter to experience a shift to shorter wavelengths in its center wavelength because the round trip path length for constructive and destructive interference shortens.

For a multilayer dielectric structure, an incident plane wave sees an effective index $n_{eff}$ that can be approximated by the average index within the structure. The effective index can be used to determine macroscopically how a plane wave would interact with the medium under Fresnel reflections and transmissions. This abstraction provides a means of predicting how the center wavelength of the filter, $\lambda(\theta)$, varies as a function of angle of incidence, $\theta$. This angle dependence follows the formula:

$$\lambda(\theta) = \lambda_{\theta=0} \cos(\theta/n_{eff})$$

For conventional dielectric narrowband filters, $n_{eff}$ is typically approximately between 1.5 and 1.8. For higher index materials one can obtain values of 3.2 and greater using, for example, III-V semiconductor materials, such as GaAs/AlGaAs or InGaAs/AlAsSb. A plot of the change in center wavelength, $\delta\lambda$, as a function of the angle of incidence is shown in FIG. 9 for different $n_{eff}$ values. One can use Snell's law to understand that a high index material will bend light more towards the normal than a low index material; this concept extends to the case here, where an effective index describes Fresnel interactions. Such high index narrowband filters provide low angle sensitivity for the wavelength selective reflectors thus allowing different signals' frequencies to be spaced as closely as about 1 nm (about 125 Ghz) and at the same time keeping the field of view as wide as approximately 10 degrees.

Figure 10:
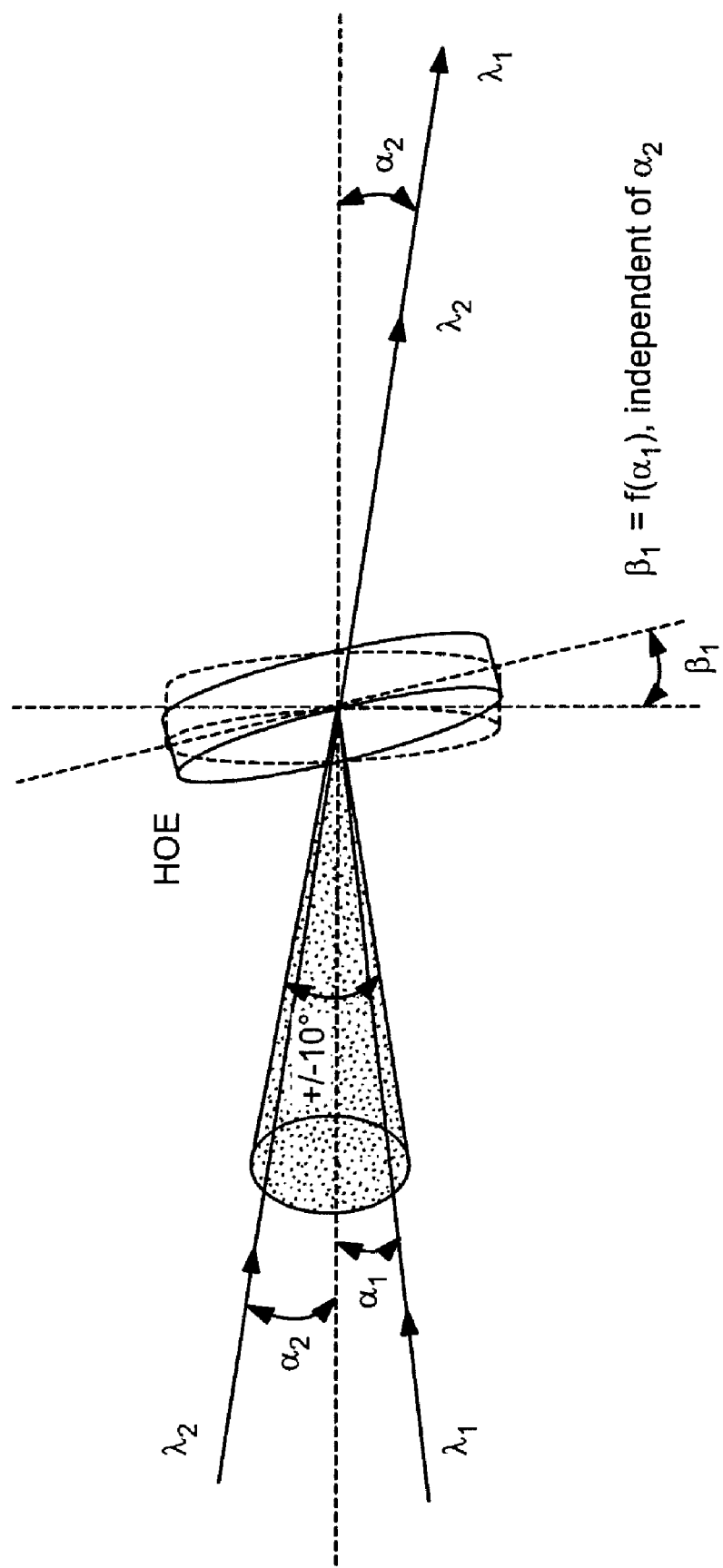
FIG. 10 shows the functioning of a holographic optical element.

FIG. 10 illustrates the functioning of holographic optical elements, which may be used to implement deflectors (HOE deflectors) as an alternative or in addition to wavelength selective reflectors in embodiments of this invention.

Holographic optical elements (HOE) are constructed by photorefractive imprinting of a periodic structure within a glass substrate and can produce chromatically-dependent bending of light. Their basic operation is similar to a diffraction grating with the exception that the holographic element can operate in transmission instead of reflection. HOEs can have extremely narrow spectral features. They may be produced using photothermorefractive glass (PTRG) technology which provides high spectral efficiency and may be used for wavelengths near 1550 nm.

The operation of a transmission-mode HOE is shown in FIG. 10. Laser beams at two different input wavelengths are incident upon the device in the vicinity of normal incidence. $\lambda_1$ (for example, 1550 nm) is Bragg-matched to the grating so that it is diffracted by the HOE, while $\lambda_2$ (for example, greater than 1560 nm or less than 1550 nm) is far enough outside of the HOE's spectral zone of selectivity so that it passes through the HOE undeflected. The diagram shows the case where two HOEs are combined into a single glass substrate thus creating a two-dimensional HOE deflector. A single conventional HOE steers in one plane.

Figure 11:
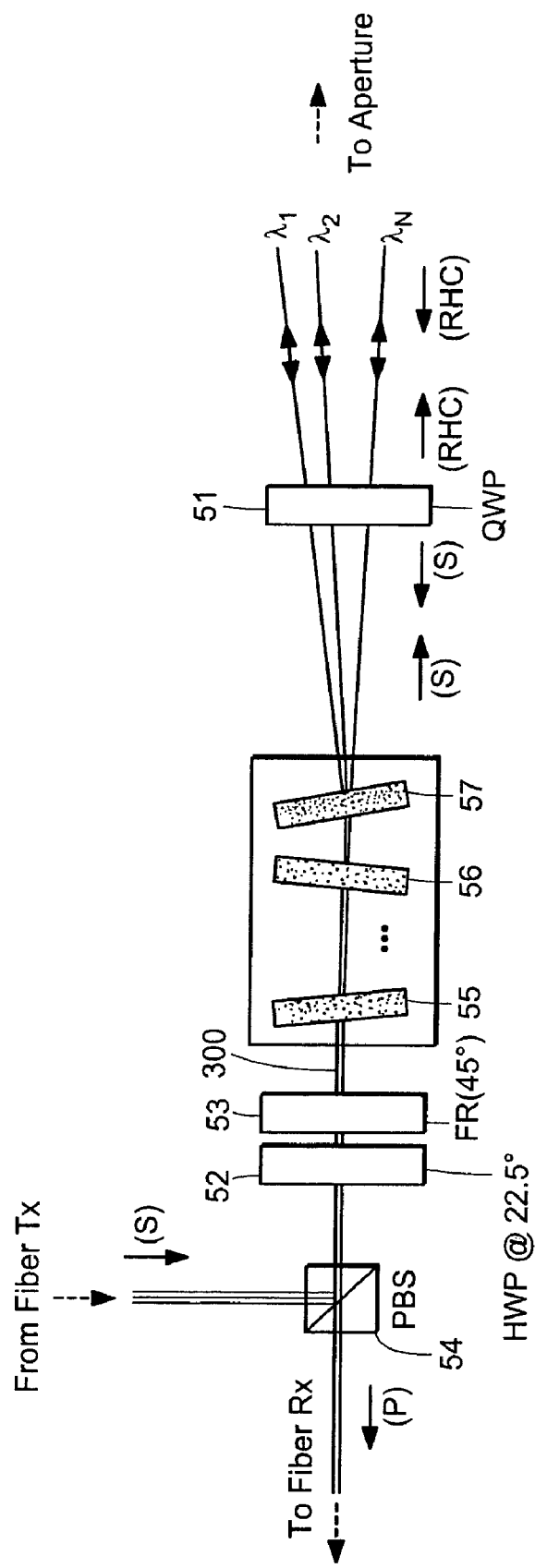
FIG. 11 shows an embodiment of this invention using a single stack of deflectors.

The use of the deflectors such as or similar to HOE deflectors in an embodiment of this invention is shown in FIG. 11. Each deflector 55-57 acts upon a single wavelength channel chosen among $\lambda_1$-$\lambda_N$, directing it into the common path. There is an incoming and outgoing signal for each wavelength $\lambda_1$-$\lambda_N$, each signal at the same wavelength. The Faraday rotator 53 and half-wave plate 52, acting in combination as a directional rotation module, apply different polarizations to the incoming, received (Rx), and outgoing, transmitted (Tx), signals to isolate them, while eliminating any polarization effects within the wavelength steering deflectors 55-57 by keeping all wavelengths there at a common linear polarization (denoted as S). A quarter wave plate 51 transforms the linearly polarized waves into right hand circularly (RHC) polarized waves passing through the aperture. The PBS 54 separates the received and transmitted signals which are polarized within orthogonal planes P and S on the right side of the DRM 52-53 and have a common polarization S on the signal path 300.

The advantages of this transmission-mode approach over the reflection-mode bandpass filter approach described above include fewer optical components and no direct retroreflections which improves isolation. Furthermore, the transmission-mode operation also allows one to neglect the polarization effects of the HOE within HOE deflectors and operate with undefined, arbitrary polarizations.

Figure 12:
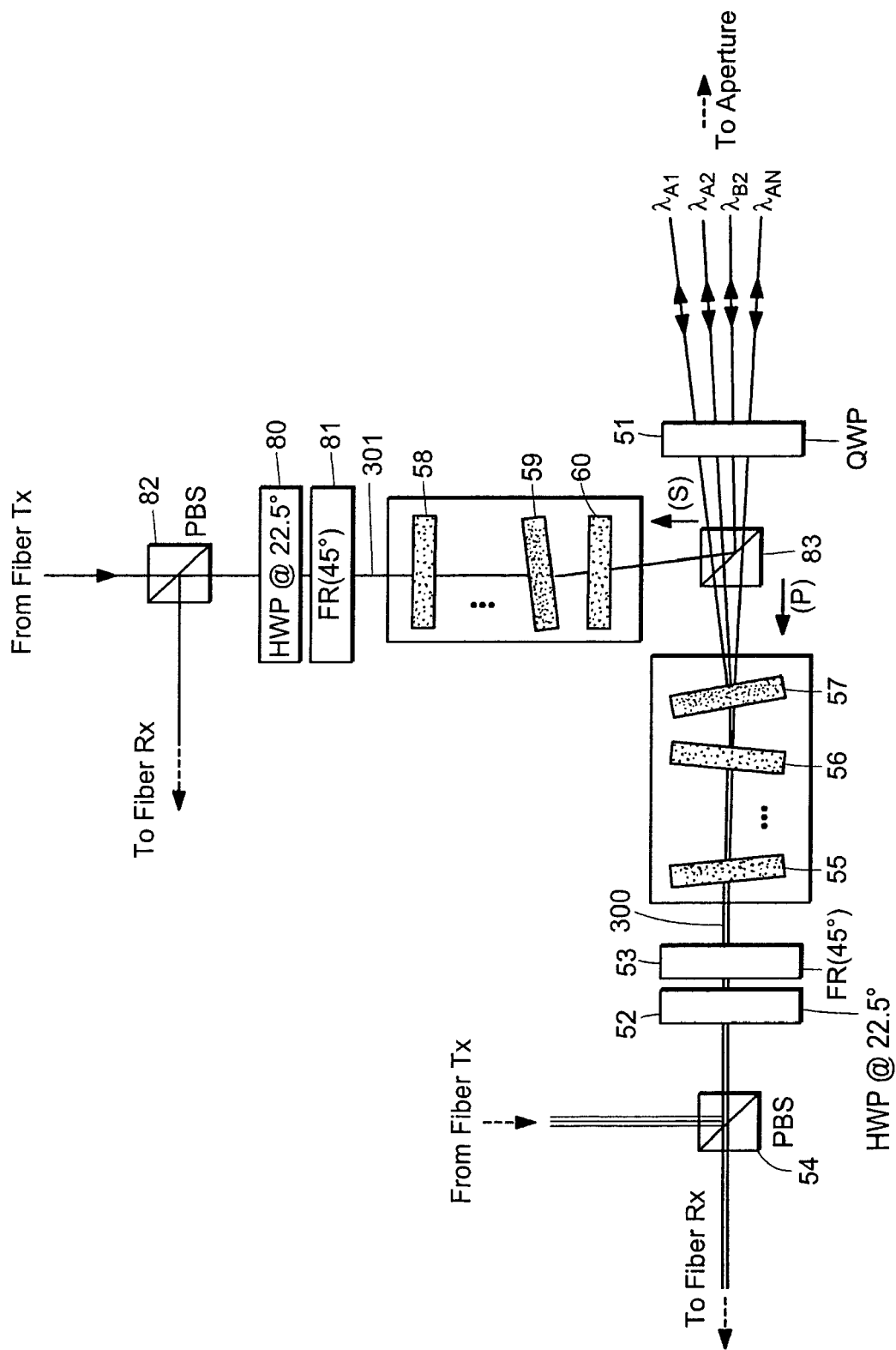
FIG. 12 shows an embodiment of this invention using two stacks of deflectors.

Another embodiment of this invention using HOE devices to steer wavelengths, as shown in FIG. 12, increases the number of channels by using orthogonal polarizations. In this setup, waves with different linear polarizations (denoted as P and S) are steered either by the deflectors 55-57 or deflectors 58-60. Each of the deflectors 55-60 may contain individual HOEs that deflect the appropriate wavelength. The PBS 83 separates received signals and joins transmitted signals of orthogonal linear polarization. Directional rotation modules composed of HWP 52 and FR 53 and HWP 80 and FR 81 change the polarization of signals depending on their direction and allow use of PBS 82 and PBS 54 for separating and joining transmitted and received signals Tx and Rx before and after they traverse the signal paths 300 and 301.

Deflectors 57 and 60 may be referred to as front deflectors, while deflectors 55 and 58 may be referred to as back deflectors.

Figure 13:
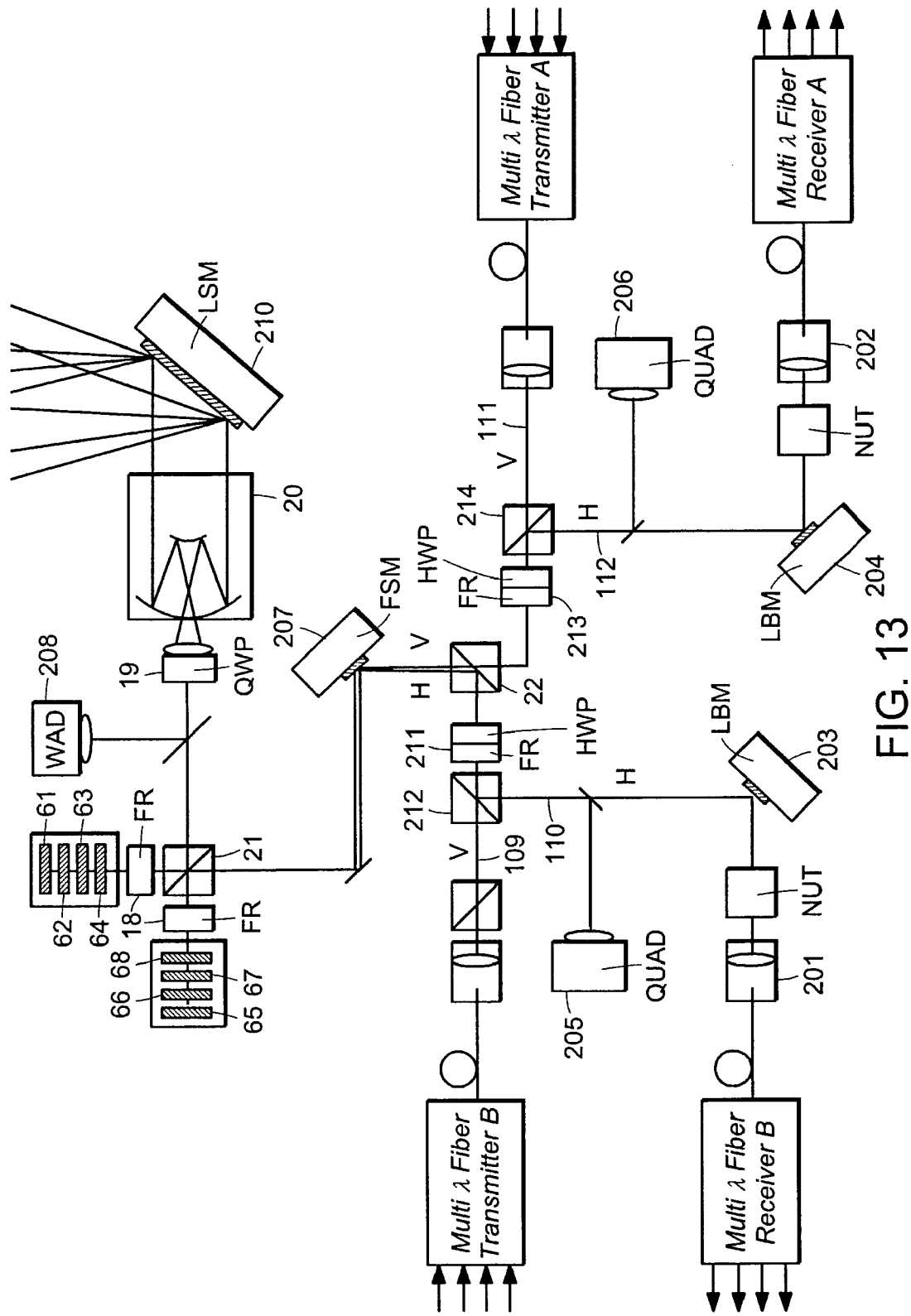
FIG. 13 shows an embodiment of this invention with additional details.

FIG. 13 shows an embodiment of this invention similar to the embodiment shown in FIG. 5. The components absent in FIG. 5 include the following elements employed for precise aiming and tracking of the signals outside the device: nutating fiber coupling systems, 201 and 202, mirrors applying point ahead angle to compensate for relative motion between terminals, 203 and 204, quad-area detectors, 205 and 206, fast steering mirror for removing mechanical jitter, 207, wide area detector for acquisition, 208, large steering mirror pointing to the general theater of operation, 210. Directional rotation modules 211 and 213 composed of half-wave plates and Faraday rotators change the polarization of signals depending on their direction and allow the use of PBS 212 and PBS 214 for separating and joining transmitted and received signals.

Figure 14:
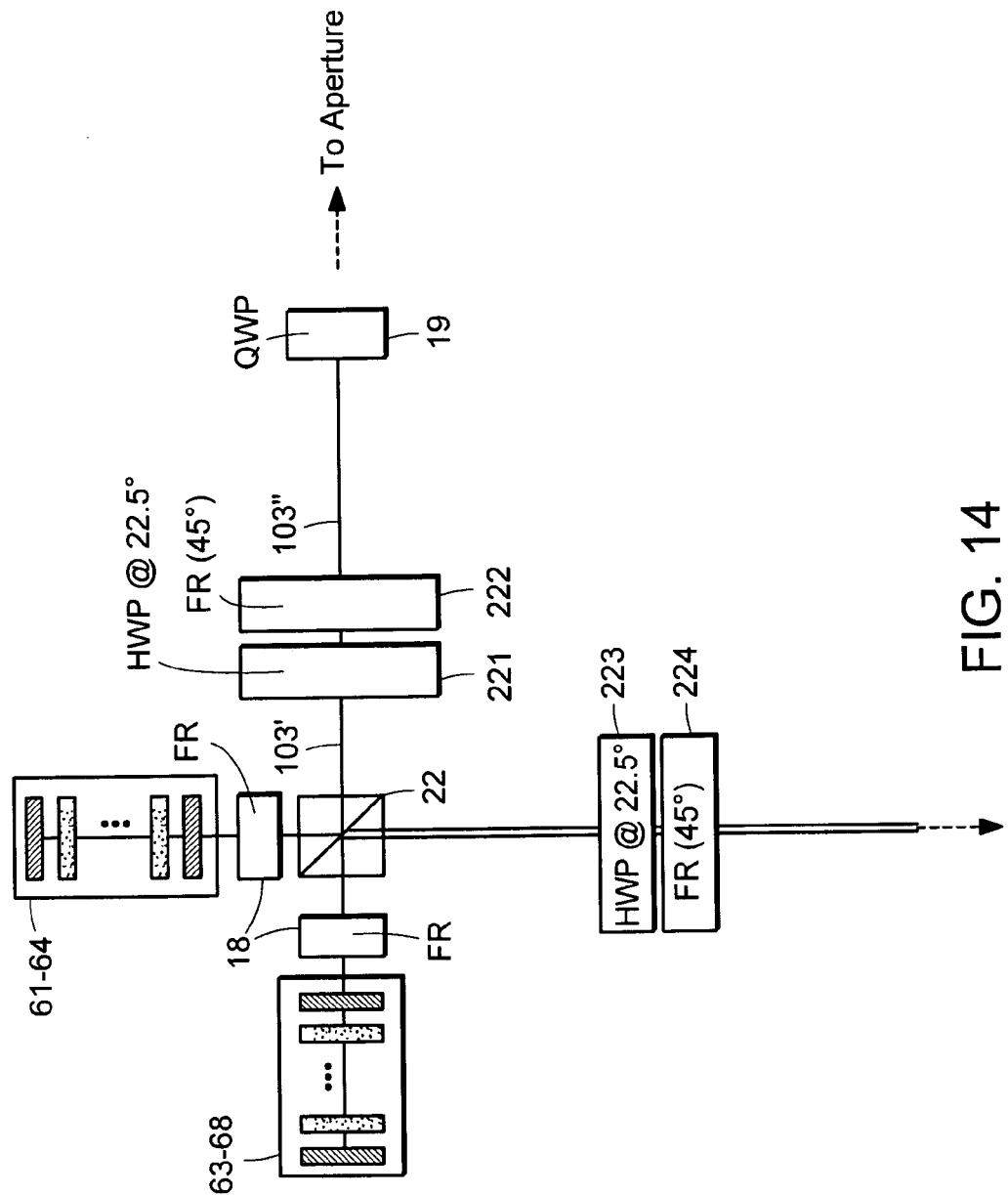
FIG. 14 illustrates some uses of directional rotation modules in some embodiments this invention.

FIG. 14 illustrates additional possible uses of directional rotation modules in embodiments of this invention. The directional rotation module composed of HWP 221 and FR 222 gives in combination with QWP 19 opposite (LHC and RHC) circular polarizations to the received and transmitted signals handled by the same reflector (chosen among 61-68) for the same target. This provides additional isolation between such signals. The directional rotation module 221-222 gives orthogonal polarizations on 103" to any two signals with identical linear polarization moving in opposite directions along 103'.

The directional rotation module composed of HWP 223 and FR 224 may take the role of the directional rotation modules 211 and 213 of FIG. 13.

As can be seen from the above description, embodiments of this invention may use a single aperture to provide significant size, weight, power, and cost reductions for airborne, spacecraft, and terrestrial applications. The directional rotation module combined with a wavelength steering mirror assembly provides polarization division multiplexing of channels and high optical isolation between transmit and receive channels and reduces hardware requirements by redundant use of components. The optical bandpass filter with low sensitivity to angle-of-incidence allows a high number of arbitrarily pointed WDM channels. The terrestrial network applications of this invention exist in dense urban areas where fiber deployment is impractical and/or expensive. The specific applications of this invention include network nodes, relay links between points of presence, and wavelength and polarization routing switches. In all these cases aperture sharing has the advantages of reduced cost, rapid provisioning, and more efficient utilization of size, weight, and power.

While this invention has been particularly shown and described with references to preferred embodiments thereof, it will be understood by those skilled in the art that various changes in form and details may be made therein without departing from the scope of the invention encompassed by the appended claims.

What is claimed is:

1. A communication device comprising:
    an aperture structure; and
    wavelength dependent deflectors deflecting respective electromagnetic signals of respective wavelengths at different respective wavelength dependent angles to simultaneously, dynamically and independently steer the electromagnetic signals passing through the aperture structure in different wavelength dependent angular directions through free space to or from remote receiver or transmitter devices at different angular locations.

2. A device of claim 1 further comprising an aperture linear/circular polarization device between at least one of the deflectors and the aperture structure.

3. A device of claim 1 wherein at least one of the deflectors is movable.

4. A device of claim 1 wherein the deflectors form a first stack, a deflector in the first stack passing a signal deflected by another deflector in the first stack.

5. A device of claim 4 wherein at least one deflector in the first stack deflects substantially all signals within a wavelength band.

6. A device of claim 5 wherein individual deflectors in the first stack deflect substantially all signals each within its respective non-overlapping wavelength band and pass signals deflected by other deflectors in the first stack.

7. A device of claim 6 wherein at least one of the deflectors in the first stack is movable and reflects signals at nearly normal incidence.

8. A device of claim 6 wherein the deflectors in the first stack are reflectors.

9. A device of claim 4 wherein individual deflectors in the first stack pass signals deflected by other deflectors in the first stack.

10. A device of claim 1 wherein electromagnetic signals deflected by at least one of the deflectors carry communications transmitted by the device and communications received by the device.

11. A device of claim 1 wherein the aperture structure is a telescope.

12. A device of claim 1 wherein the device transmits and/or receives wavelength division multiplexing electromagnetic signals.

13. A method for communication comprising:
passing electromagnetic signals through an aperture structure; and
deflecting respective electromagnetic signals of respective wavelengths at different respective angles, by wavelength dependent deflectors to simultaneously dynamically and independently steer the electromagnetic signals passing through the aperture structure in different wavelength dependent angular directions through free space to or from remote receiver or transmitter devices at different angular locations.

14. A method of claim 13 further comprising changing type of polarization of electromagnetic signals using an aperture linear/circular polarization device positioned between at least one of the deflectors and the aperture structure.

15. A method of claim 13 wherein at least one of the deflectors is movable.

16. A method of claim 13 wherein the deflectors form a first stack, a deflector in the first stack passing a signal deflected by another deflector in the first stack.

17. A method of claim 16 wherein at least one deflector in the first stack deflects substantially all signals within a wavelength band.

18. A method of claim 17 wherein individual deflectors in the first stack deflect substantially all signals each within its respective non-overlapping wavelength band and pass signals deflected by other deflectors in the first stack.

19. A method of claim 18 wherein at least one of the deflectors in the first stack is movable and reflects signals at nearly normal incidence.

20. A method of claim 18 wherein the deflectors in the first stack are reflectors.

21. A method of claim 16 wherein individual deflectors in the first stack pass signals deflected by other deflectors in the first stack.

22. A method of claim 13 wherein electromagnetic signals deflected by at least one of the deflectors carry communications transmitted by the device and communications received by the device.

23. A method of claim 13 wherein the aperture structure is a telescope.

24. A method of claim 13 further comprising transmitting and/or receiving wavelength division multiplexing electromagnetic signals.

25. A communication device comprising:
aperture means; and
means for wavelength dependent deflecting of respective wavelength division multiplexing electromagnetic signals of respective wavelengths at different respective angles simultaneously to dynamically and independently steer the electromagnetic signals passing through the aperture means in different wavelength dependent angular directions through free space to or from remote receiver or transmitter devices at different angular locations.

26. A device of claim 25 further comprising means for linear/circular polarization between at least one of means for deflecting and the aperture means.

27. A device of claim 25 wherein at least one of the means for deflecting is movable.

28. A device of claim 25 wherein the means for deflecting form a first stack, each means for deflecting in the first stack passing a signal deflected by another means for deflecting in the first stack.

29. A device of claim 28 wherein at least one means for deflecting in the first stack deflects substantially all signals within a wavelength band.

30. A device of claim 29 wherein individual means for deflecting in the first stack deflect substantially all signals each within its respective non-overlapping wavelength band and pass signals deflected by other means for deflecting in the first stack.

31. A device of claim 30 wherein at least one of the means for deflecting in the first stack is movable and reflects signals at nearly normal incidence.

32. A device of claim 30 wherein the means for deflecting in the first stack are means for reflecting.

33. A device of claim 30 further comprising a second stack of means for deflecting respective electromagnetic signals passing through the aperture structure at respective angles, individual means for deflecting in the second stack deflecting substantially all signals each within its respective non-overlapping wavelength band and passing signals deflected by other means for deflecting in the second stack.

34. A device of claim 33 wherein a wavelength band of at least one means for deflecting of the second stack is located between wavelength bands of two means for deflecting of the first stack and a wavelength band of at least one means for deflecting of the first stack is located between wavelength bands of two means for deflecting of the second stack.

35. A device of claim 28 wherein individual means for deflecting in the first stack pass signals deflected by other means for deflecting in the first stack.

36. A device of claim 28 further comprising:
first means for beam splitting according to polarization coupled to the aperture means and the first stack;
means for conveying signals coupled to the first means for beam splitting; and
first means for linear/circular polarization, positioned so that electromagnetic signals deflected by at least one of the means for deflecting in the first stack, are deflected at nearly normal angle, are linearly polarized when leaving and entering the first means for beam splitting, and, before being deflected, first pass through the first means for beam splitting and then pass through the first linear/circular polarization device and, after being deflected, first pass through the first means for linear/circular polarization and then pass through the first means for beam splitting, the means for deflecting in the first stack being means for reflecting.

37. A device of claim 36 further comprising:
first means for conveying transmission signals; and
first means for conveying received signals, the means for conveying signals receiving from the first means for conveying transmission signals at least one signal carrying communications transmitted by the device and the first means for conveying received signals receiving from the means for conveying signals at least one signal carrying communications received by the device, the electromagnetic signals deflected by at least one of the means for deflecting in the first stack carrying communications transmitted by the device and communications received by the device.

38. A device of claim 36 wherein at least one of the means for deflecting in the first stack is movable.

39. A device of claim 36 further comprising:
a second stack comprising means for deflecting respective electromagnetic signals passing through the aperture means at respective angles, the individual means for deflecting in the first stack passing signals deflected by other means for deflecting in the first stack and individual means for deflecting in the second stack passing signals deflected by other means for deflecting in the second stack, the means for deflecting in the second stack being means for reflecting; and second means for linear/circular polarization, positioned so that electromagnetic signals deflected by at least one of the means for deflecting in the second stack, are deflected at nearly normal angle, are linearly polarized when leaving and entering the first means for beam splitting, and, before being deflected, first pass through the means for beam splitting and then pass through the second means for linear/circular polarization and, after being deflected, first pass through the second means for linear/circular polarization and then pass through the first means for beam splitting, the direction of polarization of the electromagnetic signals passing through the first means for linear/circular polarization being substantially orthogonal, within the means for conveying signals, to the direction of polarization of the electromagnetic signals passing through the second means for linear/circular polarization.

40. A device of claim 39 further comprising:

second means for beam splitting according to polarization coupled to the means for conveying signals;

first means for conveying transmission signals;

first means for conveying received signals;

second means for conveying transmission signals;

second means for conveying received signals;

first means for conveying polarized signals coupled to the second means for beam splitting; the first means for conveying polarized signals receiving from the first means for conveying transmission signals at least one signal carrying communications transmitted by the device and the first means for conveying received signals receiving from the first means for conveying polarized signals at least one signal carrying communications received by the device; and second means for conveying polarized signals coupled to the second means for beam splitting; the second means for conveying polarized signals receiving from the second means for conveying transmission signals at least one signal carrying communications transmitted by the device and the second means for conveying received signals receiving from the second means for conveying polarized signals at least one signal carrying communications received by the device.

41. A device of claim 28 further comprising:

a first means for beam splitting according to polarization coupled to the aperture means and the first stack;

a means for conveying signals coupled to first the means for beam splitting; and a first means for polarization rotation, positioned so that electromagnetic signals deflected by at least one of the means for deflecting in the first stack, are deflected at nearly normal angle, are linearly polarized when leaving and entering the first means for beam splitting, and, before being deflected, first pass through the first means for beam splitting and then pass through the first means for polarization rotation and, after being deflected, first pass through the first means for polarization rotation and then pass through the first means for beam splitting, the means for deflecting in the first stack being means for reflecting.

42. A device of claim 41 further comprising:

first means for conveying transmission signals; and first means for conveying received signals, the means for conveying signals receiving from the first means for conveying transmission signals at least one signal carrying communications transmitted by the device and the first means for conveying received signals receiving from the signal path at least one signal carrying communications received by the device, the electromagnetic signals deflected by at least one of the means for deflecting in the first stack carrying communications transmitted by the device and communications received by the device.

43. A device of claim 41 wherein at least one of the means for deflecting in the first stack is movable.

44. A device of claim 41 further comprising:

a second stack comprising means for deflecting respective electromagnetic signals passing through the aperture means at respective angles, the individual means for deflecting in the first stack passing signals deflected by other means for deflecting in the first stack and individual means for deflecting in the second stack passing signals deflected by other means for deflecting in the second stack, the means for deflecting in the second stack being means for reflecting; and a second means for polarization rotation, positioned so that electromagnetic signals deflected by at least one of the means for deflecting in the second stack, are deflected at nearly normal angle, are linearly polarized when leaving and entering the first means for beam splitting, and, before being deflected, first pass through the first means for beam splitting and then pass through the second means for polarization rotation and, after being deflected, first pass through the second means for polarization rotation and then pass through the first polarization beam splitter, the direction of polarization of the electromagnetic signals passing through the first means for polarization rotation being substantially orthogonal, within the means for conveying signals, to the direction of polarization of the electromagnetic signals passing through the second means for polarization rotation.

45. A device of claim 44 further comprising:

second means for beam splitting according to polarization coupled to the signal path;

first means for conveying transmission signals;

first means for conveying received signals;

second means for conveying transmission signals;

second means for conveying received signals;

first means for conveying polarized signals coupled to the second means for beam splitting; the first means for conveying polarized signals receiving from the first means for conveying transmission signals at least one signal carrying communications transmitted by the device and the first means for conveying received signals receiving from the first means for conveying polarized signals at least one signal carrying communications received by the device; and second means for conveying polarized signals coupled to the second means for beam splitting; the second means for conveying polarized signals receiving from the second means for conveying transmission signals at least one signal carrying communications transmitted by the device and the second means for conveying received signals receiving from the second means for conveying polarized signals at least one signal carrying communications received by the device.

46. A device of claim 41 further comprising:

a second stack comprising means for deflecting respective electromagnetic signals passing through the aperture means at respective angles, the individual means for deflecting in the first stack passing signals deflected by other means for deflecting in the first stack and individual means for deflecting in the second stack passing signals deflected by other means for deflecting in the second stack, the means for deflecting in the second stack being means for reflecting; and means for linear/circular polarization, positioned so that electromagnetic signals deflected by at least one of the means for deflecting in the second stack, are deflected at nearly normal angle, are linearly polarized when leaving and entering the first means for beam splitting, and, before being deflected, first pass through the first means for beam splitting and then pass through the means for linear/circular polarization and, after being deflected, first pass through the means for linear/circular polarization and then pass through the first means for beam splitting, the direction of polarization of the electromagnetic signals passing through the first means for polarization rotation being substantially orthogonal, within the means for conveying signals, to the direction of polarization of the electromagnetic signals passing through the means for linear/circular polarization.

47. A device of claim 28 further comprising a second stack comprised of means for deflecting respective electromagnetic signals passing through the aperture means at respective angles, at least one means for deflecting in the second stack passing at least one signal deflected by another means for deflecting in the second stack.

48. A device of claim 47 wherein individual means for deflecting in the first stack pass signals deflected by other means for deflecting in the first stack and individual means for deflecting in the second stack passing signals deflected by other means for deflecting in the second stack.

49. A device of claim 47 further comprising means for beam splitting according to polarization coupled to the first stack, second stack, and the aperture means.

50. A device of claim 25 wherein electromagnetic signals deflected by at least one of the means for deflecting carry communications transmitted by the device and communications received by the device.

51. A device of claim 25 wherein the aperture means is a telescope.

52. A communication device comprising:
an aperture structure configured to receive and/or transmit electromagnetic signals;
a polarization element configured to alter a polarization of the electromagnetic signals;
a polarizing splitting element configured to split the electromagnetic signals into first and second electromagnetic signals based on an altered polarization of the electromagnetic signals;
a first stack of deflectors deflecting first respective electromagnetic signals of respective wavelengths at respective angles, individual deflectors in the first stack deflecting substantially all first electromagnetic signals within the individual deflectors' respective non-overlapping wavelength band and passing first electromagnetic signals deflected by other deflectors in the first stack, with at least one deflector in the first stack deflecting substantially all first signals within a wavelength band;
a second stack of deflectors defecting second respective electromagnetic signals of respective wavelengths at respective angles, individual deflectors in the second stack deflecting substantially all second electromagnetic signals within the individual deflectors' respective non-overlapping wavelength band and passing second electromagnetic signals deflected by other deflators in the second stack, with at least one deflector in the second stack deflecting substantially all second electromagnetic signals within a wavelength band;

a first polarization rotation device positioned so that the first electromagnetic signals pass through the first polarization rotation device before being deflected by the first stack of deflectors and, after being deflected, pass through the first polarization rotation device and then pass through the polarizing splitting element; and a second polarization rotation device positioned so that the second electromagnetic signals pass through the second polarization rotation device before being deflected by the second stack of deflectors and, after being deflected, pass through the second polarization rotation device and then pass through the polarizing splitting element.

53. A device of claim 52 wherein at least one second stack deflectors' wavelength band is located between two first stack deflectors' wavelength bands and at least one first stack deflectors' wavelength band is located between two second stack deflectors' wavelength bands.

54. A communication device comprising:
an aperture structure;
a stack of deflectors deflecting respective electromagnetic signals of respective wavelengths at respective angles, the electromagnetic signals passing through the aperture structure, a defector in the stack passing a signal deflected by another deflector in the stack;
a polarization beam splitter coupled to the aperture structure and the stack;
a signal path coupled to the polarization beam splitter; and
a linear/circular polarization device, positioned so that electromagnetic signals deflected by at least one of the deflectors in the stack, are deflected at nearly normal angle, are linearly polarized when leaving and entering the polarization beam splitter, and, before being deflected, pass through the polarization beam splitter and then pass through the linear/circular polarization device and, after being deflected, pass through the linear/circular polarization device and then pass through the polarization beam splitter, the deflectors in the stack being reflectors.

55. A device of claim 54 further comprising:
a transmission path; and
a reception path, the signal path receiving from the transmission path at least one signal carrying communications transmitted by the device and the reception path receiving from the signal path at least one signal carrying communications received by the device, the electromagnetic signals deflected by at least one of the deflectors in the stack carrying communications transmitted by the device and communications received by the device.

56. A device of claim 54 wherein at least one of the deflectors in the stack is movable.

57. A device of claim 54 further comprising:
a second stack of deflectors deflecting respective electromagnetic signals passing through the aperture structure at respective angles, the individual deflectors in the stack passing signals deflected by other deflectors in the stack and individual deflectors in the second stack passing signals deflected by other deflectors in the second stack, the deflectors in the second stack being reflectors; and
a second linear/circular polarization device, positioned so that electromagnetic signals deflected by at least one of the deflectors in the second stack, are deflected at nearly normal angle, are linearly polarized when leaving and entering the polarization beam splitter, and, before being deflected, pass through the polarization beam splitter and then pass through the second linear/circular polarization device and, after being deflected, pass through the second linear/circular polarization device and then pass through the polarization beam splitter, the direction of polarization of the electromagnetic signals passing through the linear/circular polarization device being substantially orthogonal, within the signal path, to the direction of polarization of the electromagnetic signals passing through the second linear/circular polarization device.

58. A device of claim 57 further comprising:
a second polarization beam splitter coupled to the signal path;
a first transmission path;
a first reception path;
a second transmission path;
a second reception path;
a first polarized path coupled to the second polarization beam splitter; the first polarized path receiving from the first transmission path at least one signal carrying communications transmitted by the device and the first reception path receiving from the first polarized path at least one signal carrying communications received by the device; and
a second polarized path coupled to the second polarization beam splitter; the second polarized path receiving from the second transmission path at least one signal carrying communications transmitted by the device and the second reception path receiving from the second polarized path at least one signal carrying communications received by the device.

59. A communication device comprising:
an aperture structure;
a stack of deflectors deflecting respective electromagnetic signals of respective wavelengths at respective angles, the electromagnetic signals passing through the aperture structure, a defector in the stack passing a signal deflected by another deflector in the stack;
a polarization beam splitter coupled to the aperture structure and the stack;
a signal path coupled to the polarization beam splitter; and
a polarization rotation device, positioned so that electromagnetic signals deflected by at least one of the deflectors in the stack, are deflected at nearly normal angle, are linearly polarized when leaving and entering the polarization beam splitter, and, before being deflected, pass through the polarization beam splitter and then pass through the polarization rotation device and, after being deflected, pass through the polarization rotation device and then pass through the polarization beam splitter, the deflectors in the stack being reflectors.

60. A device of claim 59 further comprising:
a transmission path; and
a reception path, the signal path receiving from the transmission path at least one signal carrying communications transmitted by the device and the reception path receiving from the signal path at least one signal carrying communications received by the device, the electromagnetic signals deflected by at least one of the deflectors in the stack carrying communications transmitted by the device and communications received by the device.

61. A device of claim 59 wherein at least one of the deflectors in the first stack is movable.

62. A device of claim 59 further comprising:
a second stack of deflectors deflecting respective electromagnetic signals passing through the aperture structure at respective angles, the individual deflectors in the stack passing signals deflected by other deflectors in the stack and individual deflectors in the second stack passing signals deflected by other deflectors in the second stack, the deflectors in the second stack being reflectors; and
a second polarization rotation device, positioned so that electromagnetic signals deflected by at least one of the deflectors in the second stack, are deflected at nearly normal angle, are linearly polarized when leaving and entering the polarization beam splitter, and, before being deflected, pass through the polarization beam splitter and then pass through the second polarization rotation device and, after being deflected, pass through the second polarization rotation device and then pass through the polarization beam splitter, the direction of polarization of the electromagnetic signals passing through the polarization rotation device being substantially orthogonal, within the signal path, to the direction of polarization of the electromagnetic signals passing through the second polarization rotation device.

63. A device of claim 62 further comprising:
a second polarization beam splitter coupled to the signal path;
a first transmission path;
a first reception path;
a second transmission path;
a second reception path;
a first polarized path coupled to the second polarization beam splitter; the first polarized path receiving from the first transmission path at least one signal carrying communications transmitted by the device and the first reception path receiving from the first polarized path at least one signal carrying communications received by the device; and
a second polarized path coupled to the second polarization beam splitter; the second polarized path receiving from the second transmission path at least one signal carrying communications transmitted by the device and the second reception path receiving from the second polarized path at least one signal carrying communications received by the device.

64. A device of claim 59 further comprising:
a second stack of deflectors deflecting respective electromagnetic signals passing through the aperture structure at respective angles, the individual deflectors in the stack passing signals deflected by other deflectors in the stack and individual deflectors in the second stack passing signals deflected by other deflectors in the second stack, the deflectors in the second stack being reflectors; and
a linear/circular polarization device, positioned so that electromagnetic signals deflected by at least one of the deflectors in the second stack, are deflected at nearly normal angle, are linearly polarized when leaving and entering the polarization beam splitter, and, before being deflected, pass through the polarization beam splitter and then pass through the linear/circular polarization device and, after being deflected, pass through the linear/circular polarization device and then pass through the polarization beam splitter, the direction of polarization of the electromagnetic signals passing through the polarization rotation device being substantially orthogonal, within the signal path, to the direction of polarization of the electromagnetic signals passing through the linear/circular polarization device.

65. A communication device comprising:
an aperture structure configured to receive and/or transmit electromagnetic signals;
a polarization element configured to alter a polarization of the electromagnetic signals;

a polarizing splitting element configured to split the electromagnetic signals into first and second electromagnetic signals based on an altered polarization of the electromagnetic signals;

a first stack of deflectors deflecting respective first electromagnetic signals of respective wavelengths at respective angles, individual deflectors in the first stack configured to pass first electromagnetic signals deflected by other deflectors in the first stack;

a second stack of deflectors deflecting respective second electromagnetic signals being directed towards, individual deflectors in the second stack configured to pass second electromagnetic signals deflected by other deflectors in the second stack;

a first polarization rotation device positioned so that the first electromagnetic signals pass through the first polarization rotation device before being deflected by the first stack of deflectors and, after being deflected, pass through the first polarization rotation device and then pass through the polarizing splitting element; and a second polarization rotation device positioned so that the second electromagnetic signals pass through the second polarization rotation device before being deflected by the second stack of deflectors and, after being deflected, pass through the second polarization rotation device and then pass through the polarizing splitting element.

66. A method for communication comprising:

passing of electromagnetic signals by an aperture structure;

altering a polarization of the electromagnetic signals;

splitting the electromagnetic signals into first and second electromagnetic signals based on an altered polarization state;

passing the first electromagnetic signals through a first polarization rotation device;

passing the second electromagnetic signals through a second polarization rotation device;

deflecting first respective electromagnetic signals of respective wavelengths at respective angles by a first stack of deflectors, the deflecting further comprising:
  individual deflectors in the first stack deflecting substantially all the first electromagnetic signals each within its respective non-overlapping wavelength band and passing the first electromagnetic signals deflected by other deflectors in the first stack; and deflecting second respective electromagnetic signals at respective wavelengths at respective angles using a second stack of deflectors, the deflecting further comprising:
  individual deflectors in the second stack deflecting substantially all the second electromagnetic signals each within its respective non-overlapping wavelength band and passing the second electromagnetic signals deflected by other deflectors in the second stack; and passing the first and second electromagnetic signals, after deflection, through the respective first and second polarization rotation devices.

67. A method of claim 66 wherein at least one second stack deflectors' wavelength band is located between two first stack deflectors' wavelength bands and at least one first stack deflectors' wavelength band is located between two second stack deflectors' wavelength bands.

68. A method for communication comprising:

passing of electromagnetic signals by an aperture structure;

deflecting respective electromagnetic signals of respective wavelengths at respective angles by a stack of deflectors;

passing a signal to a deflector in the stack, deflected by another deflector in the stack;

coupling a polarization beam splitter to the aperture structure and the stack;

coupling a signal path to the polarization beam splitter; and positioning a linear/circular polarization device so that electromagnetic signals deflected by at least one of the deflectors in the stack, are deflected at nearly normal angle, are linearly polarized when leaving and entering the first polarization beam splitter, and, before being deflected, first pass through the polarization beam splitter and then pass through the linear/circular polarization device and, after being deflected, pass through the linear/circular polarization device and then pass through the polarization beam splitter, the deflectors in the stack being reflectors.

69. A method of claim 68 further comprising:

receiving by the signal path from a first transmission path at least one signal carrying communications transmitted by the device; and receiving by a first reception path from the signal path at least one signal carrying communications received by the device, the electromagnetic signals deflected by at least one of the deflectors in the stack carrying communications transmitted by the device and communications received by the device.

70. A method of claim 68 wherein at least one of the deflectors in the stack is movable.

71. A method of claim 68 further comprising:

using a second stack of deflectors to deflect respective electromagnetic signals passing through the aperture structure at respective angles, the individual deflectors in the stack passing signals deflected by other deflectors in the stack and individual deflectors in the second stack passing signals deflected by other deflectors in the second stack, the deflectors in the second stack being reflectors; and positioning a second linear/circular polarization device so that electromagnetic signals deflected by at least one of the deflectors in the second stack, are deflected at nearly normal angle, are linearly polarized when leaving and entering the polarization beam splitter, and, before being deflected, first pass through the polarization beam splitter and then pass through the second linear/circular polarization device and, after being deflected, first pass through the second linear/circular polarization device and then pass through the polarization beam splitter, the direction of polarization of the electromagnetic signals passing through the linear/circular polarization device being substantially orthogonal, within the signal path, to the direction of polarization of the electromagnetic signals passing through the second linear/circular polarization device.

72. A method of claim 71 further comprising:

coupling a second polarization beam splitter to the signal path;

coupling a first polarized path to the second polarization beam splitter; the first polarized path receiving from a first transmission path at least one signal carrying communications transmitted by the device and a first reception path receiving from the first polarized path at least one signal carrying communications received by the device; and coupling a second polarized path to the second polarization beam splitter; the second polarized path receiving from a second transmission path at least one signal carrying communications transmitted by the device and a second reception path receiving from the second polarized path at least one signal carrying communications received by the device.

73. A method for communication comprising:

passing of electromagnetic signals by an aperture structure;

deflecting respective electromagnetic signals of respective wavelengths at respective angles by a stack of deflectors;

passing a signal to a deflector in the stack, deflected by another deflector in the stack;

coupling a polarization beam splitter to the aperture structure and the stack;

coupling a signal path to the polarization beam splitter; and positioning a polarization rotation device so that electromagnetic signals deflected by at least one of the deflectors in the stack, are deflected at nearly normal angle, are linearly polarized when leaving and entering the polarization beam splitter, and, before being deflected, first pass through the polarization beam splitter and then pass through the polarization rotation device and, after being deflected, first pass through the polarization rotation device and then pass through the polarization beam splitter, the deflectors in the stack being reflectors.

74. A method of claim 73 further comprising:

receiving by the signal path from a first transmission path at least one signal carrying communications transmitted by the device, and receiving by a first reception path from the signal path at least one signal carrying communications received by the device, the electromagnetic signals deflected by at least one of the deflectors in the stack carrying communications transmitted by the device and communications received by the device.

75. A method of claim 73 wherein at least one of the deflectors in the first stack is movable.

76. A method of claim 73 further comprising:

deflecting by a second stack of deflectors respective electromagnetic signals passing through the aperture structure at respective angles, the individual deflectors in the stack passing signals deflected by other deflectors in the stack and individual deflectors in the second stack passing signals deflected by other deflectors in the second stack, the deflectors in the second stack being reflectors; and positioning a second polarization rotation device so that electromagnetic signals deflected by at least one of the deflectors in the second stack, are deflected at nearly normal angle, are linearly polarized when leaving and entering the polarization beam splitter, and, before being deflected, first pass through the polarization beam splitter and then pass through the second polarization rotation device and, after being deflected, first pass through the second polarization rotation device and then pass through the polarization beam splitter, the direction of polarization of the electromagnetic signals passing through the polarization rotation device being substantially orthogonal, within the signal path, to the direction of polarization of the electromagnetic signals passing through the second polarization rotation device.

77. A method of claim 76 further comprising:

coupling a second polarization beam splitter to the signal path;

coupling a first polarized path to the second polarization beam splitter; the first polarized path receiving from a first transmission path at least one signal carrying communications transmitted by the device and a first reception path receiving from the first polarized path at least one signal carrying communications received by the device; and coupling a second polarized path to the second polarization beam splitter; the second polarized path receiving from a second transmission path at least one signal carrying communications transmitted by the device and a second reception path receiving from the second polarized path at least one signal carrying communications received by the device.

78. A method of claim 77 further comprising:

deflecting respective electromagnetic signals passing through the aperture structure at respective angles by a second stack of deflectors, the individual deflectors in the stack passing signals deflected by other deflectors in the stack and individual deflectors in the second stack passing signals deflected by other deflectors in the second stack, the deflectors in the second stack being reflectors; and positioning a linear/circular polarization device so that electromagnetic signals deflected by at least one of the deflectors in the second stack, are deflected at nearly normal angle, are linearly polarized when leaving and entering the polarization beam splitter, and, before being deflected, first pass through the polarization beam splitter and then pass through the linear/circular polarization device and, after being deflected, first pass through the linear/circular polarization device and then pass through the polarization beam splitter, the direction of polarization of the electromagnetic signals passing through the polarization rotation device being substantially orthogonal, within the signal path, to the direction of polarization of the electromagnetic signals passing through the linear/circular polarization device.

\* \* \* \* \*

UNITED STATES PATENT AND TRADEMARK OFFICE
CERTIFICATE OF CORRECTION

PATENT NO. : 7,627,251 B2
APPLICATION NO. : 10/603071
DATED : December 1, 2009
INVENTOR(S) : Walther et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Second Day of November, 2010

David J. Kappos
*Director of the United States Patent and Trademark Office*